(12) United States Patent
Hirzallah et al.

(10) Patent No.: US 12,375,954 B2
(45) Date of Patent: Jul. 29, 2025

(54) REPORTING ENVIRONMENTAL STATES OF A USER EQUIPMENT

(71) Applicant: QUALCOMM Incorporated, San Diego, CA (US)

(72) Inventors: Mohammed Ali Mohammed Hirzallah, San Diego, CA (US); Rajat Prakash, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 17/837,922

(22) Filed: Jun. 10, 2022

(65) Prior Publication Data

US 2023/0403584 A1   Dec. 14, 2023

(51) Int. Cl.
*H04W 24/08* (2009.01)
*H04W 24/10* (2009.01)
*H04W 72/21* (2023.01)
*H04W 72/23* (2023.01)

(52) U.S. Cl.
CPC .......... *H04W 24/08* (2013.01); *H04W 24/10* (2013.01); *H04W 72/21* (2023.01); *H04W 72/23* (2023.01)

(58) Field of Classification Search
CPC ..... H04W 24/08; H04W 72/21; H04W 72/23; H04W 24/10
See application file for complete search history.

(56) References Cited

U.S. PATENT DOCUMENTS

| | | | | |
|---|---|---|---|---|
| 2022/0377844 | A1* | 11/2022 | Kumar | H04W 88/08 |
| 2023/0006913 | A1* | 1/2023 | Lo | H04L 41/0853 |
| 2023/0131694 | A1* | 4/2023 | Saber | G06N 3/0455 |
| | | | | 370/252 |
| 2023/0145844 | A1* | 5/2023 | Kwon | G06N 20/00 |
| | | | | 370/329 |
| 2023/0246724 | A1* | 8/2023 | Pateromichelakis | |
| | | | | H04W 72/0453 |
| | | | | 370/329 |
| 2023/0354247 | A1* | 11/2023 | Hirzallah | G06N 3/09 |
| 2023/0403584 | A1* | 12/2023 | Hirzallah | G06N 3/08 |
| 2024/0154670 | A1* | 5/2024 | Lee | H04B 7/0658 |
| 2024/0162955 | A1* | 5/2024 | Whinnett | H04W 24/10 |
| 2024/0349082 | A1* | 10/2024 | Li | H04W 24/02 |
| 2025/0016593 | A1* | 1/2025 | Narayanan Thangaraj | |
| | | | | H04B 7/0626 |
| 2025/0063411 | A1* | 2/2025 | Karapantelakis | H04W 24/10 |

FOREIGN PATENT DOCUMENTS

WO   WO-2022178706 A1 *   9/2022   ............. G06N 20/20

* cited by examiner

*Primary Examiner* — Michael J Moore, Jr.
(74) *Attorney, Agent, or Firm* — Holland & Hart LLP/Qualcomm

(57) ABSTRACT

Methods, systems, and devices for wireless communications are described. The method may include the user equipment (UE) receiving control signaling indicating a set of schemes for reporting an environmental state associated with the UE and measuring one or more channel characteristics according to a scheme of the set of schemes. Moreover, the UE may transmit a report indicating the environmental state associated with the UE based on measuring the one or more channel characteristics. A machine learning model implemented by the UE, a network entity, or both is based on the indicated environmental state associated with the UE.

30 Claims, 18 Drawing Sheets

REPORTING ENVIRONMENTAL STATES OF A USER EQUIPMENT

FIELD OF TECHNOLOGY

The following relates to wireless communications, including reporting environmental states of a user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a wireless communications system may support machine learning. Machine learning may be an example of a branch of artificial intelligence that provides systems with the ability to improve and learn from experience. In order to implement machine learning, devices of the wireless communications system (e.g., a base station or a UE) may receive an indication of a machine learning model from a network and over time, the network may update the machine learning model or provide a new machine learning model to the devices.

SUMMARY

The described techniques relate to improved methods, systems, devices, and apparatuses that support reporting environmental states of a user equipment (UE). For example, the described techniques provide for signaling schemes for reporting environmental state information associated with a UE to a network. In some cases, the reporting of the environment state information associated with the UE to the network may be for the purpose of machine learning model tuning. In some examples, the UE may receive control signaling from a network entity indicating a set of schemes for reporting an environmental state associated with the UE to the network entity. Each scheme of the set of schemes may have one or more corresponding channel characteristics among other metrics associated with reporting the environmental state associated with the UE. Moreover, the UE may receive signaling activating at least one scheme of the set of schemes. Upon receiving the activation signaling, the UE may measure the one or more channel characteristics corresponding to the at least one activated scheme and transmit a report indicating the environmental state associated with the UE, where the environmental state associated with the UE is determined based on the measurements of the one or more channel characteristics. Using the methods as described herein may provide a framework for UE reporting of its environmental state to the network entity and the network entity may utilize the environmental state to make updates to machine learning procedures.

A method for wireless communication at a UE is described. The method may include receiving control signaling indicating a set of schemes for reporting an environmental state associated with the UE, measuring one or more channel characteristics according to a scheme of the set of schemes, and transmitting a report indicating the environmental state associated with the UE based on measuring the one or more channel characteristics, where a machine learning model implemented by the UE, a network entity, or both is based on the indicated environmental state associated with the UE.

An apparatus for wireless communication at a UE is described. The apparatus may include a processor, memory coupled with the processor, and instructions stored in the memory. The instructions may be executable by the processor to cause the apparatus to receive control signaling indicating a set of schemes for reporting an environmental state associated with the UE, measure one or more channel characteristics according to a scheme of the set of schemes, and transmit a report indicating the environmental state associated with the UE based on measuring the one or more channel characteristics, where a machine learning model implemented by the UE, a network entity, or both is based on the indicated environmental state associated with the UE.

Another apparatus for wireless communication at a UE is described. The apparatus may include means for receiving control signaling indicating a set of schemes for reporting an environmental state associated with the UE, means for measuring one or more channel characteristics according to a scheme of the set of schemes, and means for transmitting a report indicating the environmental state associated with the UE based on measuring the one or more channel characteristics, where a machine learning model implemented by the UE, a network entity, or both is based on the indicated environmental state associated with the UE.

A non-transitory computer-readable medium storing code for wireless communication at a UE is described. The code may include instructions executable by a processor to receive control signaling indicating a set of schemes for reporting an environmental state associated with the UE, measure one or more channel characteristics according to a scheme of the set of schemes, and transmit a report indicating the environmental state associated with the UE based on measuring the one or more channel characteristics, where a machine learning model implemented by the UE, a network entity, or both is based on the indicated environmental state associated with the UE.

Some examples of the method, apparatuses, and non-transitory computer-readable medium described herein may further include operations, features, means, or instructions for transmitting signaling indicating a capability of the UE to report the environmental state associated with the UE, where receiving the control signaling may be based on transmitting the signaling.

In some examples of the method, apparatuses, and non-transitory computer-readable medium described herein, transmitting the signaling indicating the capability may include operations, features, means, or instructions for transmitting radio resource control (RRC) signaling indicating the capability of the UE to report the environmental state associated with the UE, the RRC signaling including an indication of the capability of the UE to measure the one or more channel characteristics, one or more second channel characteristics supported by the UE, one or more techniques for detecting a change to the one or more channel characteristics supported by the UE, a set of resources for monitoring the one or more channel characteristics supported by the UE, a periodicity associated with the set of resources supported by the UE, or any combination thereof.

In some examples of the method, apparatuses, and non-transitory computer-readable medium described herein, receiving the control signaling indicating the set of schemes for reporting the environmental state associated with the UE may include operations, features, means, or instructions for receiving RRC signaling indicating the set of schemes for reporting the environmental state associated with the UE, the RRC signaling including an indication of an identifier (ID), a set of resources for measuring the one or more channel characteristics, a type of reference signal to be received over the set of resources, one or more second channel characteristics, a periodicity associated with the set of resources, a periodicity associated with transmitting the report, a trigger event corresponding to transmitting the report, one or more techniques for detecting a change to the environmental state, or a threshold associated with the one or more techniques for each respective scheme of the set of schemes.

Some examples of the method, apparatuses, and non-transitory computer-readable medium described herein may further include operations, features, means, or instructions for receiving a medium access control-control element (MAC-CE) that activates a subset of the set of schemes for reporting the environmental state associated with the UE, where measuring the one or more channel characteristics may be based on receiving the MAC-CE.

Some examples of the method, apparatuses, and non-transitory computer-readable medium described herein may further include operations, features, means, or instructions for receiving downlink control information (DCI) that activates the scheme of the set of schemes for reporting the environmental state associated with the UE, where measuring the one or more channel characteristics may be based on receiving the DCI.

In some examples of the method, apparatuses, and non-transitory computer-readable medium described herein, transmitting the report indicating the environmental state associated with the UE may include operations, features, means, or instructions for transmitting uplink control information (UCI) including the report.

Some examples of the method, apparatuses, and non-transitory computer-readable medium described herein may further include operations, features, means, or instructions for comparing the one or more channel characteristics with one or more second channel characteristics that may be stored at the UE and determining that a divergence parameter between the one or more channel characteristics and the one or more second channel characteristics satisfies a threshold, where transmitting the report may be based on the divergence parameter satisfying the threshold.

In some examples of the method, apparatuses, and non-transitory computer-readable medium described herein, comparing the one or more channel characteristics with the one or more second channel characteristics may include operations, features, means, or instructions for determining the divergence parameter between the one or more channel characteristics and the one or more second channel characteristics, where transmitting the report may be based on the divergence parameter between the one or more channel characteristics and the one or more second channel characteristics exceeding the threshold.

Some examples of the method, apparatuses, and non-transitory computer-readable medium described herein may further include operations, features, means, or instructions for receiving, based on transmitting the report, signaling indicating one or more parameters associated with the machine learning model.

Some examples of the method, apparatuses, and non-transitory computer-readable medium described herein may further include operations, features, means, or instructions for implementing the machine learning model to perform one or more wireless procedures based on the one or more parameters associated with the machine learning model.

Some examples of the method, apparatuses, and non-transitory computer-readable medium described herein may further include operations, features, means, or instructions for determining the environmental state associated with the UE based on the one or more channel characteristics, where the one or more channel characteristics include a reference signal received power (RSRP), a signal-to-interference-plus-noise ratio (SINR), a Doppler delay, a delay spread, an angle of arrival of a received signal, an angle of departure of a transmitted signal, or any combination thereof.

Some examples of the method, apparatuses, and non-transitory computer-readable medium described herein may further include operations, features, means, or instructions for determining the environmental state associated with the UE based on one or more sensor outputs, where the one or more sensor outputs include a velocity of the UE, a location of the UE relative to the network entity, an orientation of the UE, or any combination thereof.

In some examples of the method, apparatuses, and non-transitory computer-readable medium described herein, the environmental state includes conditions of radio frequency signals that surround the UE.

A method for wireless communication at a network entity is described. The method may include transmitting control signaling indicating a set of schemes for reporting an environmental state associated with a UE and receiving a report indicating the environmental state associated with the UE based on the control signaling, where a machine learning model implemented by the UE, the network entity, or both is based on the indicated environmental state associated with the UE.

An apparatus for wireless communication at a network entity is described. The apparatus may include a processor, memory coupled with the processor, and instructions stored in the memory. The instructions may be executable by the processor to cause the apparatus to transmit control signaling indicating a set of schemes for reporting an environmental state associated with a UE and receive a report indicating the environmental state associated with the UE based on the control signaling, where a machine learning model implemented by the UE, the network entity, or both is based on the indicated environmental state associated with the UE.

Another apparatus for wireless communication at a network entity is described. The apparatus may include means for transmitting control signaling indicating a set of schemes for reporting an environmental state associated with a UE and means for receiving a report indicating the environmental state associated with the UE based on the control signaling, where a machine learning model implemented by the UE, the network entity, or both is based on the indicated environmental state associated with the UE.

A non-transitory computer-readable medium storing code for wireless communication at a network entity is described. The code may include instructions executable by a processor to transmit control signaling indicating a set of schemes for reporting an environmental state associated with a UE and receive a report indicating the environmental state associated with the UE based on the control signaling, where a machine learning model implemented by the UE, the network entity, or both is based on the indicated environmental state associated with the UE.

Some examples of the method, apparatuses, and non-transitory computer-readable medium described herein may further include operations, features, means, or instructions for receiving, from the UE, signaling indicating a capability of the UE to report the environmental state associated with the UE, where transmitting the control signaling may be based on receiving the signaling.

In some examples of the method, apparatuses, and non-transitory computer-readable medium described herein, receiving the signaling indicating the capability may include operations, features, means, or instructions for receiving RRC signaling indicating the capability of the UE to report the environmental state associated with the UE, the RRC signaling including an indication of the capability of the UE to measure to one or more channel characteristics, one or more second channel characteristics supported by the UE, one or more techniques for detecting a change to the one or more channel characteristics supported by the UE, a set of resources for measuring the one or more channel characteristics supported by the UE, a periodicity associated with the set of resources supported by the UE, or any combination thereof.

In some examples of the method, apparatuses, and non-transitory computer-readable medium described herein, transmitting the control signaling indicating the set of schemes for reporting the environmental state associated with the UE may include operations, features, means, or instructions for transmitting RRC signaling indicating the set of schemes for reporting the environmental state associated with the UE, the RRC signaling including an indication of an ID, a set of resources for measuring for one or more channel characteristics, a type of reference signals to be received over the set of resources, one or more second channel characteristics, a periodicity associated with the set of resources, a periodicity associated with transmitting the report, one or more techniques for detecting a change to the environmental state, or a threshold associated with the one or more techniques for each respective scheme of the set of schemes.

Some examples of the method, apparatuses, and non-transitory computer-readable medium described herein may further include operations, features, means, or instructions for transmitting a MAC-CE that activates a subset of the set of schemes for reporting the environmental state associated with the UE.

Some examples of the method, apparatuses, and non-transitory computer-readable medium described herein may further include operations, features, means, or instructions for transmitting DCI that activates a scheme of the set of schemes for reporting the environmental state associated with the UE.

In some examples of the method, apparatuses, and non-transitory computer-readable medium described herein, receiving the report indicating the environmental state associated with the UE may include operations, features, means, or instructions for receiving UCI including the report.

Some examples of the method, apparatuses, and non-transitory computer-readable medium described herein may further include operations, features, means, or instructions for updating a second machine learning model based on the environmental state associated with the UE, where the updated second machine learning model includes the machine learning model and transmitting signaling indicating one or more parameters associated with the machine learning model.

In some examples of the method, apparatuses, and non-transitory computer-readable medium described herein, the environmental state associated with the UE may be based on one or more channel characteristics and the one or more channel characteristics include an RSRP, an SINR, a Doppler delay, a delay spread, an angle of arrival of a received signal, an angle of departure of a transmitted signal, or any combination thereof.

In some examples of the method, apparatuses, and non-transitory computer-readable medium described herein, the environmental state associated with the UE may be based on one or more sensor outputs and the one or more sensor outputs include a velocity of the UE, a location of the UE relative to the network entity, an orientation of the UE, or any combination thereof.

In some examples of the method, apparatuses, and non-transitory computer-readable medium described herein, the environmental state includes conditions of radio frequency signals that surround the UE.

DETAILED DESCRIPTION

Figure 1:
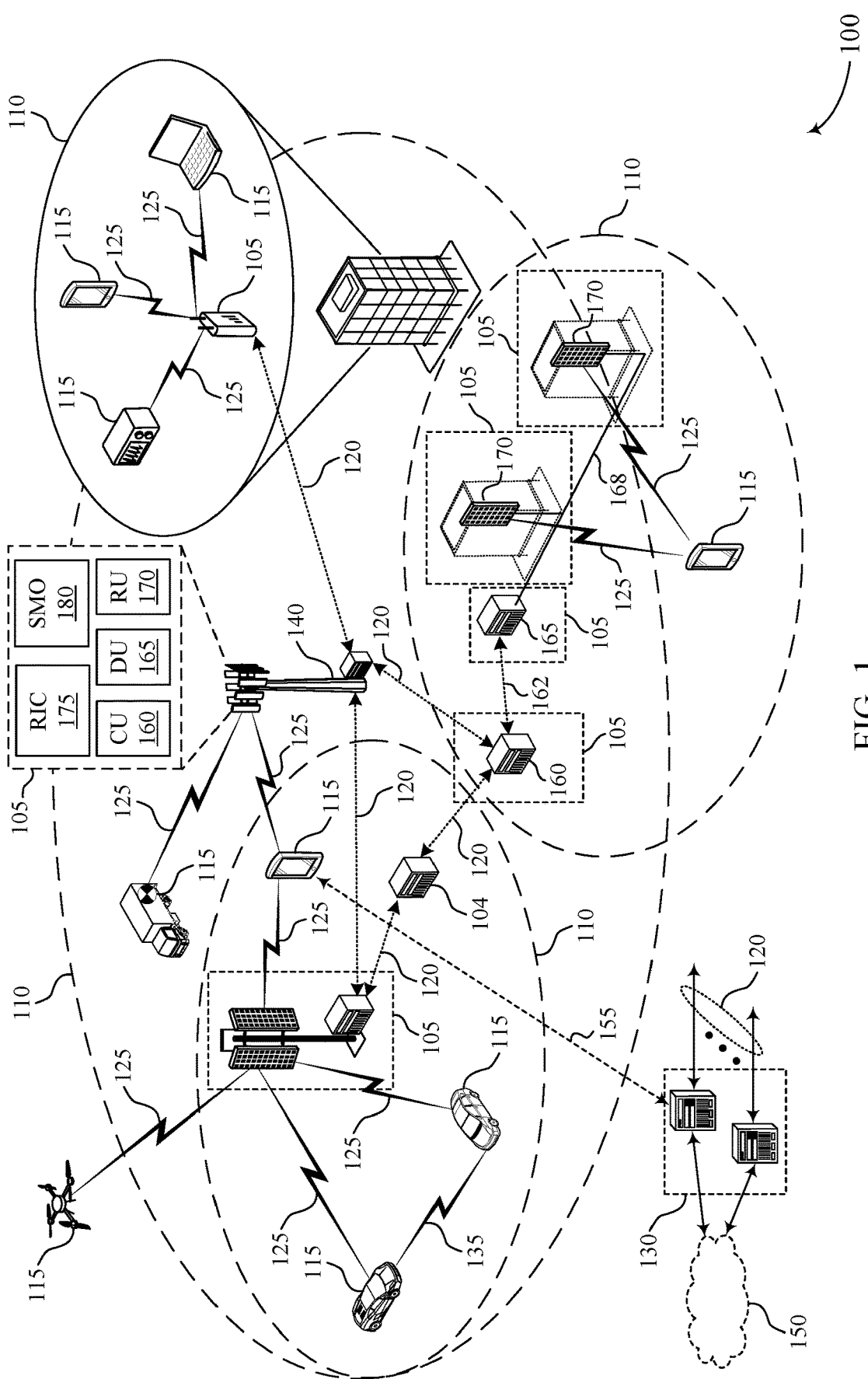
FIGS. 1 through 3 illustrate examples of a wireless communications system that supports reporting environmental states of a user equipment (UE) in accordance with one or more aspects of the present disclosure.

In some examples, a user equipment (UE) may utilize machine learning for one or more wireless communication procedures (e.g., beamforming procedures). As the UE performs the one or more wireless communication procedures, changes or updates may be made to the machine learning. For example, a new machine learning model may be selected, a machine learning model may be updated, online learning may be enabled, or tuning reinforcement learning policies may be enabled. In some examples, the changes or updates to the machine learning model may be based on an environmental state of the UE. For example, if the UE is in an open-air environment, a first machine learning algorithm may be used and if the UE is in an building environment, a second machine learning algorithm may be used.

In some examples, the environmental state of the UE may include current measurements of one or more radio metrics at the UE (e.g., signal strength measurements, doppler delay measurements, etc.) and a network entity (e.g., a base station) may make changes to or update the machine learning algorithm based on the environmental state of the UE. Moreover, the network entity may report these changes or updates to the machine learning model to the UE and the UE may implement machine learning according to the reported changes or updates to the machine learning model. However, a signaling scheme for reporting the environmental state of the UE to the network entity has yet to be realized.

As described herein, a UE may report an environmental state of the UE to the network entity. In some examples, the UE may transmit signaling indicating a capability of the UE to report the environmental state associated with the UE. Upon receiving the capability signaling, the network entity may transmit control signaling (e.g., radio resource control (RRC) signaling) indicating a set of frameworks for reporting the environmental state associated with the UE. Each framework may include an indication of an identifier, a set of resources for receiving reference signals, one or more metrics to be measured by the UE, etc. The one or more metrics may include channel characteristics of the UE or outputs of sensor located at the UE. Examples of channel characteristics may include a reference signal received power (RSRP), a received signal strength indicator (RSSI), a reference signal received quality (RSRQ), a signal-to-interference-plus-noise ratio (SINR), a channel impulse response (CIR), a crest factor reduction (CFR), or any combination thereof. Examples of sensor outputs may include a velocity of the UE, a location of the UE (e.g., in a global navigation satellite system coordinates), an orientation of the UE, or any combination thereof. In another case, the UE may include an imaging sensor (e.g., a camera) and as such, the sensor outputs may include images (e.g., camera images or sensor images).

Moreover, the UE may receive second control signaling (e.g., downlink control information (DCI) or a medium access control control element (MAC-CE)), activating one or more frameworks of the set of frameworks. The UE may measure the one or more metrics according to the activated framework and report the environmental state of the UE to the network entity (e.g., via uplink control information (UCI)). In some examples, the report may include the measurements of the one or more metrics. Using the indicated environmental state of the UE, the network entity may make updates to or changes to the machine learning and potentially, indicate this change or update to the UE.

Aspects of the disclosure are initially described in the context of wireless communications systems. Additional aspects of the disclosure are described in the context of a process flow. Aspects of the disclosure are further illustrated by and described with reference to apparatus diagrams, system diagrams, and flowcharts that relate to reporting environmental states of a UE.

FIG. 1 illustrates an example of a wireless communications system 100 that supports reporting environmental states of a UE in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reporting environmental states of a UE as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, the UE 115 may report environmental states associated with a UE to the network entity 105 for the purpose of machine learning model tuning. In some examples, the UE 115 may receive control signaling from a network entity 105 indicating a set of schemes for reporting an environmental state associated with the UE 115 to the network entity 105. Each scheme of the set of schemes may have one or more corresponding channel characteristics among other metrics associated with reporting the environmental state associated with the UE 115. Moreover, the UE 115 may receive signaling activating at least one scheme of the set of schemes. Upon receiving the activation signaling, the UE 115 may measure the one or more channel characteristics corresponding to the at least one activated scheme and transmit a report indicating the environmental state associated with the UE 115, where the environmental state associated with the UE 115 is determined based on the measurements of the one or more channel characteristics. Using the methods as described herein may provide a framework for UE 115 reporting of its environmental state to the network entity and the network entity may utilize the environmental state to make updates to machine learning procedures.

Figure 2:
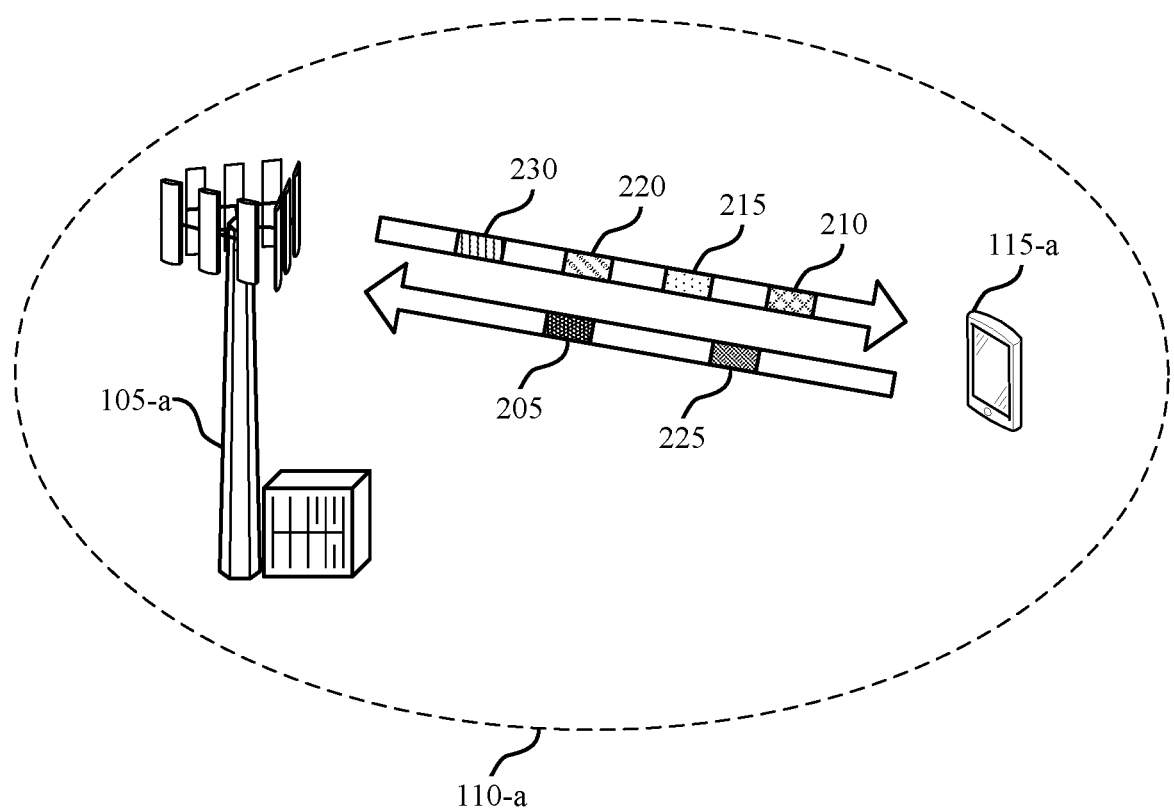

FIG. 2 illustrates an example of a wireless communications system 200 that supports reporting environmental states of a UE in accordance with one or more aspects of the present disclosure. In some examples, the wireless communications system 200 may implement aspects of the wireless communications system 100. For example, the wireless communications system 200 may include a network entity 105-a and a UE 115-a which may be examples of a network entity 105 and a UE 115 as described with reference to FIG. 1. The network entity 105-a and the UE 115-a may be located in a coverage area 110-a.

In some examples, the UE 115-a or the network entity 105-a may implement machine learning to perform one or more wireless communication procedures. Machine learning may be described as a series of algorithms that automatically improve through experience. The UE 115-a or the network entity 105-a may utilize machine learning to detect delays related to line-of-sight (LOS) signals, to perform beam management, to perform cell selection, to perform cell reselection, etc. In order to implement machine learning, the UE 115-a or the network entity 105-a may obtain a neural network model (or a machine learning model) and a neural network function. The neural network function may be described as a function supported by one or more neural network models and may be specific to a task being performed. The neural network model may be defined by a model structure and a parameter set. The model structure may indicate a number of nodes, a number of layers, etc. of the neural network model and the parameter set may include weights of the neural network model among other configuration parameters.

In some examples, the neural network model may change over time. For example, the UE 115-*a* or the network entity 105-*a* may select a new neural network model, refine the current neural network model, enable online learning, or tune reinforcement policies while performing machine learning. In some examples, a change to the neural network model may result from a change in an environmental state of the UE 115-*a*. The environmental state of the UE 115-*a* may refer to any metric that characterizes the environment of the UE 115-*a*. Some examples of these metrics may be a location of the UE 115-*a* or a signal strength value of a signal received by the UE 115-*a*. In some examples, the UE 115-*a* may not have the ability to make changes to the neural network model (e.g., select a new neural network model or update the current neural network model) and as such, changes to the neural network model may occur at the network entity 105-*a* and the network entity 105-*a* may transmit an indication of the change to the neural network model to the UE 115-*a* such that the UE 115-*a* may utilize the new or updated neural network model. As such, the network entity 105-*a* may have knowledge of the environmental state of the UE 115-*a* (e.g., in order to make the change to the neural network model). However, a signaling scheme to provide the network entity 105-*a* with knowledge of the environmental state of the UE 115-*a* has yet to be realized.

As described herein, a UE 115-*a* may provide an indication of the environmental state of the UE 115-*a* or a change to the environmental state of the UE 115-*a* to the network entity 105-*a* for the purpose of neural network model selection or tuning. In some examples, the UE 115-*a* may transmit a capability message 205 to the network entity 105-*a*. The capability message 205 may include an indication (e.g., or a flag) of a capability of the UE 115-*a* to report the environmental state of the UE 115-*a* or a change in the environmental state of the UE 115-*a* to the network entity 105-*a*. For example, the capability message 205 may include an indication of a method for detecting a change in the environmental state of the UE 115-*a* (e.g., Kullback-Leiber (KL) detection or Jensen-Shannon detection), a set of frequency resources for monitoring the environmental state of the UE 115-*a*, a set of time resources for monitoring the environmental state of the UE 115-*a*, a periodicity associated with transmitting a report indicating the environmental state of the UE 115-*a* or a change to the environmental state of the UE 115-*a*, or one or more metrics that the UE 115-*a* may monitor, each of which may supported by the UE 115-*a*. In some examples, the one or more metrics that may be monitored by the UE 115-*a* may include a location of the UE 115-*a* (e.g., in relation to the network entity 105-*a*), an orientation of the UE 115-*a*, a RSRP value, a SINR value, a Doppler delay, a delay spread, an angle of arrival of a signal at the UE 115-*a*, an angle of departure of a signal at the UE 115-*a*, a power delay profile (PDP), etc. In some examples, the one or more metrics may characterize the environmental state of the UE 115-*a*.

Upon receiving the capability message 205, the network entity 105-*a* may transmit a configuration message 210 to the UE 115-*a*. The configuration message 210 may indicate a set of environmental state configurations to the UE 115-*a*. In some examples, the network entity 105-*a* may determine the set of environmental state configurations based on the capability message 205 received from the UE 115-*a*. An environmental state configuration may include information that the UE 115-*a* may utilize during the reporting of the environmental state information to the network entity 105-*a*. For example, each environmental state configuration of the set of environmental state configurations may include an indication of a respective environmental state configuration identifier, a respective set of time and frequency resources to monitor the environmental state of the UE 115-*a*, a respective periodicity associated with the set of time and frequency resources, a respective type of a reference signal to be received by the UE 115-*a* (e.g., over the set of time and frequency resources), a respective one or more metrics that may be monitored by the UE 115-*a*, a respective method for detecting a change to the environmental state of the UE 115-*a*, and a periodicity associated with transmitting the report indicating the environmental state of the UE 115-*a* or a change to the environmental state of the UE 115-*a*. The one or more metrics indicated for each environmental state configuration in the configuration message 210 may include at least one of the one or more metrics indicated in the capability message 205. In some examples, the capability message 205 may be an example of RRC signaling. In some examples, the configuration message 210 may be an example of RRC signaling, such as an RRC configuration message or an RRC reconfiguration message.

Moreover, the UE 115-*a* may receive an activation message 215 from the network entity 105-*a*. In some examples, the activation message 215 may activate one or more environmental state configurations of the set of environmental state configurations indicated in the configuration message 210. The network entity 105-*a* may indicate which environmental state configurations of the set of environmental state configurations to activate by including one or more environmental state configuration identifiers in the activation message 215. In some examples, the activation message 215 may be an example of a MAC-CE or DCI. Using the MAC-CE for the activation, the network entity 105-*a* may facilitate semi-persistent monitoring of the environmental state. Alternatively, using DCI for the activation, the network entity 105-*a* may facilitate occasional or periodic monitoring of the environmental state.

Upon receiving the activation message 215, the UE 115-*a* may determine the environmental state of the UE 115-*a* or a change in the environmental state of the UE 115-*a* according to the activated one or more environmental state configurations. That is, the UE 115-*a* may monitor the environmental state of the UE 115-*a*. In one example, the UE 115-*a* may receive one or more signals (e.g., reference signals 220) from the network entity 105-*a* over a set of resources (e.g., the set of resources associated with the activated environmental state configuration) and utilize the one or more received reference signals to determine one or more metrics (e.g., the one or more metrics associated with the activated environmental state configuration). In such example, the one or more metrics may be an RSRP value or an SINR value of the one or more received signals. In another example, the UE 115-*a* may identify an output of a sensor at the UE 115-*a* (e.g., an accelerometer, a motion sensor, or an imaging sensor) and utilize the output of the sensor to determine the one or more metrics. In such example, the one or more metrics may be a velocity of the UE 115-*a*, an orientation of the UE 115-*a*, or images taken at the UE 115-*a*.

Upon determining the one or more metrics, the UE 115-*a* may potentially determine whether a change in environmental state of the UE 115-*a* has occurred. The UE 115-*a* may determine whether the change in the environmental state of the UE 115-*a* has occurred by comparing the one or more metrics to one or more second metrics. The one or more second metrics may be examples of threshold values associated with the metrics, criteria associated with the metrics, model metrics or metrics used during training of the neural network model and the one or more second metrics may be stored at the UE 115-*a*. If there is a difference between the one or more metrics and the one or more second metrics, the UE 115-*a* may determine that the change to the environmental state of the UE 115-*a* has occurred. In some examples, the UE 115-*a* may compare the one or more metrics to the one or more second metrics using KL detection and determine a KL divergence between the one or more metrics and the one or more second metrics. If the KL divergence exceeds a threshold, the UE 115-*a* may determine that the change to the environmental state of the UE 115-*a* has occurred. In some examples, an indication of the threshold may be included in the configuration message 210.

The UE 115-*a* may report the environmental state of the UE 115-*a* or the change to the environmental state of the UE 115-*a* to the network entity in a report 225. In the case that the UE 115-*a* reports the environmental state of the UE 115-*a*, the report 225 may include an indication of the values of the one or more metrics that where monitored by the UE 115-*a* (e.g., RSRP values of the signals received at the UE 115-*a* or a location of the UE 115-*a*). In the case that the UE 115-*a* reports the change to the environmental state of the UE 115-*a*, the report 225 may include the difference between the one or more metrics and the one or more second metrics (e.g., the KL divergence). In some examples, the UE 115-*a* may transmit the report 225 on a periodic basis, on an aperiodic basis, or based on a trigger event. In some examples, the trigger event may be the UE 115-*a* detecting the change to the environmental state of the UE 115-*a*. In some examples, the report 225 may be included in UCI.

Upon receiving the report 225, the network entity 105-*a* may update the neural network model or select a new neural network model. In some examples, the network entity 105-*a* may update the neural network model or select the new neural network model based on the environmental state of the UE 115-*a* or the change to the environmental state of the UE 115-*a* indicated in the report 225. The network entity 105-*a* may include an indication of the new neural network or the change to the neural network to the UE 115-*a* in a machine learning message 230. The methods as described herein may provide a signaling scheme that a UE 115-*a* may use to provide an indication of the environmental state of the UE 115-*a* to the network entity 105-*a* which the network entity 105-*a* may use for model selection or tuning at the UE 115-*a*.

Figure 3:
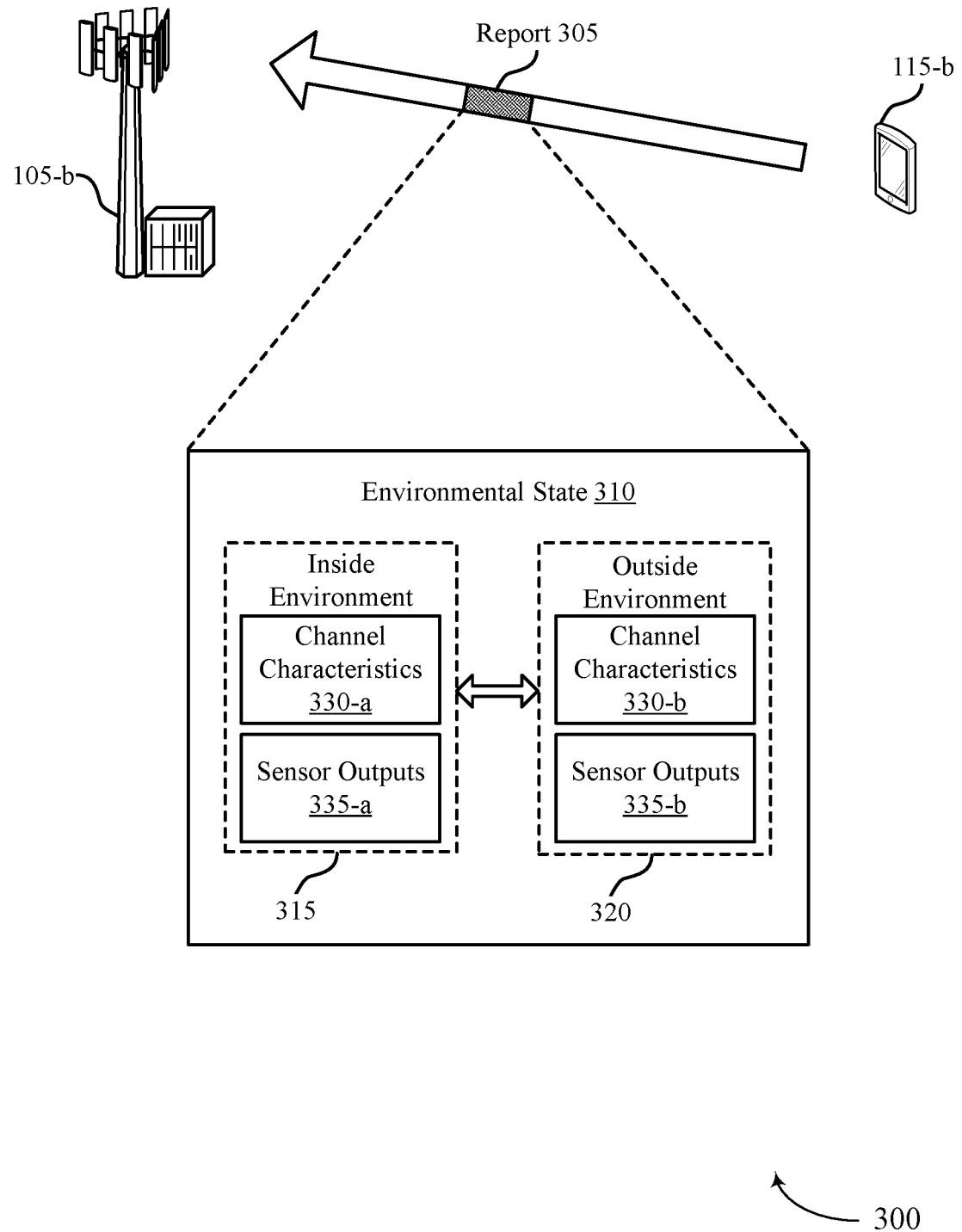

FIG. 3 illustrates an example of a wireless communications system 300 that supports reporting environmental states of a UE in accordance with one or more aspects of the present disclosure. In some examples, the wireless communications system 300 may implement aspects of a wireless communications system 100 and a wireless communications system 200. For example, the wireless communications system 300 may include a network entity 105-*b* and a UE 115-*b* which may be examples of a network entity 105 and a UE 115 as described with reference to FIGS. 1 and 2.

As described with reference to FIG. 2, the UE 115-*b* may transmit a report 305 to the network entity 105-*b* indicating an environmental state 310 of the UE 115-*b* or a change in the environmental state 310 of the UE 115-*b*. The change in the environmental state 310 may be due to the UE 115-*b* moving between different environments or moving between areas of differing surroundings. As one example, during a morning route, the UE 115-*b* may move from an inside environment 315 (e.g., a home environment) to an outside environment 320 (e.g., an open-air environment, an urban environment) and back to the inside environment 315 (e.g., an office environment). Examples of indoor environments 315 may include a home environment, an office environment, a factory environment, or other environments. Examples of outdoor environments 320 may include an open-air environment, an urban environment, a high-velocity environment (associated with travel by a vehicle), or other environments.

In some examples, each environment may be characterized by different metrics at the UE 115-*b*. An example of these metrics may be channel characteristics 330 or sensor outputs 335. As one example, the sensor output 335 may include a velocity of the UE 115-*b*. In the inside environment 315, the UE 115-*b* may be stationary for longer periods of time when compared to the outside environment 320. As such, the sensor output 335-*a* may include a lower velocity value than the sensor output 335-*b*. In another example, the channel characteristic 330 may include an RSRP value of a signal received at the UE 115-*b*. In the outside environment 320, there may be more obstacles or barriers (e.g., buildings) that may block or interfere with signaling to and from the UE 115-*b*. As such, the channel characteristic 330-*b* may include a lower RSRP value than the channel characteristics 330-*a*.

Because the channel characteristics 330 and the sensor outputs 335 may be used to characterize the environmental state 310 of the UE 115-*b*, the UE 115-*b* may use one or both of the channel characteristics 330 or the sensor outputs 335 to indicate the environmental state 310 of the UE 115-*b* or the change to the environmental state 310 of the UE 115-*b*. In the case that the UE 115-*b* indicates the environmental state 310, the UE 115-*b* may include an indication of one or both of the channel characteristics 330 or the sensor outputs 335 in the report 305. In the case that the UE 115-*b* indicates the change to the environment state the UE 115-*b* may report one or both of a difference between the channel characteristics 330 and model channel characteristics or a difference between the sensor outputs 335 and model sensor outputs. The model channel characteristics or the model sensor output may be stored at the UE 115-*b* and may be the channel characteristics or sensor outputs used during neural network model training. In some examples, the UE 115-*b* may report the channel characteristics 330 or the sensor outputs 335 measured during a monitoring instance that is configured by the network entity 105-*b* (e.g., via RRC signaling) and activated by the network entity 105-*b* (e.g., via DCI or MAC-CE). Moreover, the type of channel characteristics 330 or the type of sensor outputs 335 to be reported (e.g., RSRP vs. velocity) by the UE 115-*b* may be configured by the network entity 105-*b* (e.g., via the RRC signaling).

Figure 4:
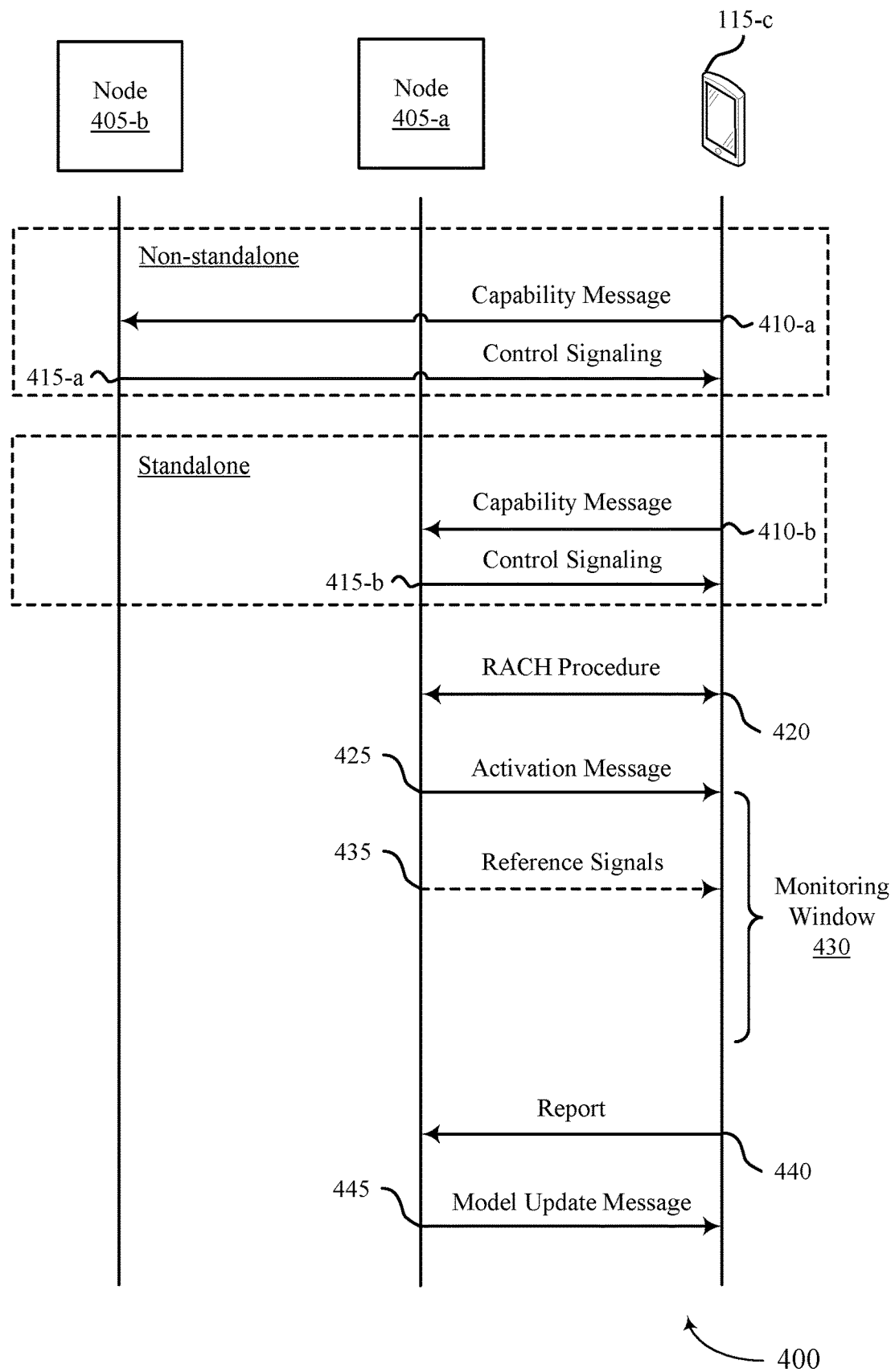
FIG. 4 illustrates an example of a process flow that supports reporting environmental states of a UE in accordance with one or more aspects of the present disclosure.

FIG. 4 illustrates an example of a process flow 400 that supports reporting environmental states of a UE in accordance with one or more aspects of the present disclosure. In some examples, the process flow 400 may implement aspects of a wireless communications system 100, a wireless communications system 200, and a wireless communications system 300. For example, the process flow 400 may include a node 405-*a*, anode 405-*b*, and a UE 115-*c* which may be examples of network entities 105 and a UE 115 as described with reference to FIGS. 1-3. Alternative examples of the following may be implemented, where some steps are performed in a different order then described or are not performed at all. In some cases, steps may include additional features not mentioned below, or further steps may be added.

In one example, the UE 115-c may operate in a non-standalone mode. In the non-standalone mode, the UE 115-c may establish a communication link with the node 405-a and the node 405-b. In some examples, the node 405-a may be an example of a gNB that supports a first RAT (e.g., NR or 5G) and may act as a secondary node for the UE 115-c. The node 405-b may be an example of an eNB that supports a second RAT (e.g., LTE or 4G) and may act as a master node for the UE 115-c. Non-standalone mode may allow the UE 115-c to anchor control signaling associated with the first RAT to a core network associated with the second RAT.

Alternatively, the UE 115-c may operate in a standalone mode. In the standalone mode, the UE 115-c may establish a communication link with the node 405-a. The node 405-a may be an example of a gNB that supports the first RAT. Unlike the non-standalone mode, the standalone mode may allow the UE 115-c to anchor signaling associated with the first RAT to a core network of the first RAT.

At 410-a, while operating in the non-standalone mode, the UE 115-c may transmit signaling indicating a capability of the UE 115-c to report an environmental state associated with the UE 115-c to the node 405-b.

At 410-b, while operating in the standalone mode, the UE 115-c may transmit signaling indicating a capability of the UE 115-c to report an environmental state associated with the UE 115-c to the node 405-a.

The environmental state associated with the UE 115-c may include conditions of radio frequency signals that surround the UE 115-c. In some examples, the signaling indicating the capability of the UE 115-c to report the environmental state may be an example of RRC signaling. In such example, the RRC signaling may include a capability information element (IE) (e.g., an additional capability IE) for environmental state monitoring. The capability IE may indicate a capability of the UE 115-c to measure one or more channel characteristics (e.g., support-Es-Monitoring), one or more channel characteristics supported by the UE 115-c (e.g., environmentalState-Type), one or more sensor outputs supported by the UE 115-c, one or more techniques for detecting a change to the one or more channel characteristics supported by the UE 115-c (e.g., detection-Method), a set of frequency resources for monitoring the one or more channel characteristics supported by the UE 115-c (e.g., max-bw), a set of frequency resources for monitoring the one or more channel characteristics supported by the UE 115-c (e.g., max-duration) or a periodicity associated with the set of resources supported by the UE 115-c. An example of the capability IE is represented below in Table 1.

In some examples, the one or more channel characteristics may include an RSPR, an SINR, a Doppler delay, a delay spread, an angle of arrival of a received signal, an angle of departure of a transmitted signal, a PDP, etc. Further, the one or more sensor outputs may include a velocity of the UE 115-c, a location of the UE 115-c relative to the node 405-c, an orientation of the UE 115-c, or any combination thereof.

At 415-a, while operating in the non-standalone mode, the UE 115-c may receive control signaling indicating a set of schemes for reporting the environmental state of the UE 115-c from the node 405-b.

At 415-b, while operating in the standalone mode, the UE 115-c may receive control signaling indicating a set of schemes for reporting the environmental state of the UE 115-c from the node 405-a.

In some examples, the control signaling may be an example of RRC signaling (e.g., an RRC reconfiguration message for the non-standalone mode and an RRC configuration message for the standalone mode). In such examples, the set of schemes for reporting the environmental state associated with the UE 115-c may be represented by a set of environmental state configurations in the RRC signaling. Each environmental state configuration of the set of environmental state configurations may include an indication of an identifier (e.g., esc-id), one or more second channel characteristics (e.g., es-type), a set of resources for measuring the one or more second channel characteristics (e.g., es-rs), a type of reference signal to be received over the set of resources, a periodicity associated with the set of resources (e.g., es-rs-periodicity), a periodicity associated with transmitting a report, a trigger event corresponding to transmitting the report, one or more techniques for detecting a change to the environmental state (e.g., es-detection-method), or a threshold associated with the one or more techniques (e.g., es-detection-method-meta-info).

In some examples, the control signaling indicating the set of the schemes for reporting the environmental state associated with the UE 115-c may be based on the capability signaling received at 410-a or 410-b. For example, the one or more second channel characteristics indicated in the control signaling may include a subset of the one or more channel characteristics indicated in the capability signaling. An example of the environmental state configurations included in the RRC signaling may be represented by Table 2.

TABLE 2

En-State-Config ::=
  ESC-list ENUMERATED SEQUENCE {ESC1, . . . , ESCN}
  ESCi SEQUENCE
  {

TABLE 1

ASN1START
TAG-ES-MONITORING-PARAMETERSNR-START
ES-ParametersNR ::=SEQUENCE {
  Support-Es-Monitoring      SUPPORT-FLAG
  detection-Method           ENUMERATED {method-a, method-b,  OPTIONAL,
                                    etc.}
  environmentalState-Type     ENUMERATED {rsrp, rssi, delay       OPTIONAL,
                                    spread, doppler spread, cfr, cir, etc.}
  max-bw                     MAX-BW                                  OPTIONAL,
  max-duration            MAX-TIME                            OPTIONAL,
}
-- TAG-ES-MONITORING-PARAMETERSNR-STOP
-- ASN1STOP TABLE 2-continued

| | |
|---|---|
| esc-id | ESC-ID |
| esc-type | ES-Type |
| es-rs | ES-RS |
| es-rs-periodicity | ES-RS-Periodicity |
| es-detection-method | ES-Detection-Method |
| es-detection-method-meta-info | ES-Detection-Method-Meta-Info |
| } | |

At 420, the UE 115-c may perform a random access channel (RACH) procedure with the node 405-a. During the RACH procedure, multiple signals (e.g., random access request, random access response, etc.) may be exchanged between the UE 115-c and the node 405-a for the purpose of initial RRC connection setup, RRC connection reestablishment, handover, non-standalone networking, etc.

At 425, the UE 115-c may receive an activation message from the node 405-a. The activation message may be transmitted to the UE 115-c via a MAC-CE or DCI. In the case of that the activation message is transmitted via the MAC-CE, the activation message may activate a subset of schemes (e.g., one or more schemes) of the set of schemes indicated in the control signaling received at 415-a or 415-b. In the case that the activation message is transmitted via DCI, the activation message may activate a scheme (e.g., a single scheme) of the set of schemes indicated in the control signaling.

Upon receiving the activation message at 425, the UE 115-c may begin monitoring a set of resources during a monitoring window at 430. During the monitoring window at 430, the UE 115-c may receive reference signals from the node 405-a at 435. In some examples, the UE 115-c may measure the reference signals and determine a value for one or more third channel characteristics based on the measurements of the reference signals. As one example, the UE 115-c may determine an RSRP value. In some examples, the one or more third characteristics may include the one or more second characteristics corresponding to the one or more schemes activated by the activation message received at 425.

Moreover, the UE 115-c may determine whether a change occurred to the environmental state associated with the UE 115-c using the one or more techniques for detecting the change to the one or more second channel characteristics indicated in the control signaling received at 415-a or 415-b. In some examples, the one or more techniques may include comparing the one or more third channel characteristics to one or more model channel characteristics to determine a divergence parameter between the one or more third channel characteristics and the one or more model channel characteristics. Further, the UE 115-c may compare the divergence parameter to a threshold and determine that a change occurred to the environmental state associated with the UE 115-c based on the divergence parameter exceeding the threshold.

At 440, the UE 115-c may transmit a report indicating the environmental state associated with the UE 115-c. In some examples, the report may include the value of the one or more third channel characteristics measured by the UE 115-c during the monitoring window at 430. In another example, the report may indicate a change to the environmental state associated with the UE 115-c. In such example, the report may include an indication of the divergence parameter determined by the UE 115-c. In some examples, the UE 115-c may transmit the report periodically or semi-persistent (e.g., dependent on the activated one or more schemes). Alternatively, the UE 115-c may transmit the report based on an event trigger. In some examples, the trigger event may include the UE 115-c determining that the change in the environmental state associated with the UE 115-c has occurred. The report may be transmitted to the node 405-a via UCI.

Figure 5:
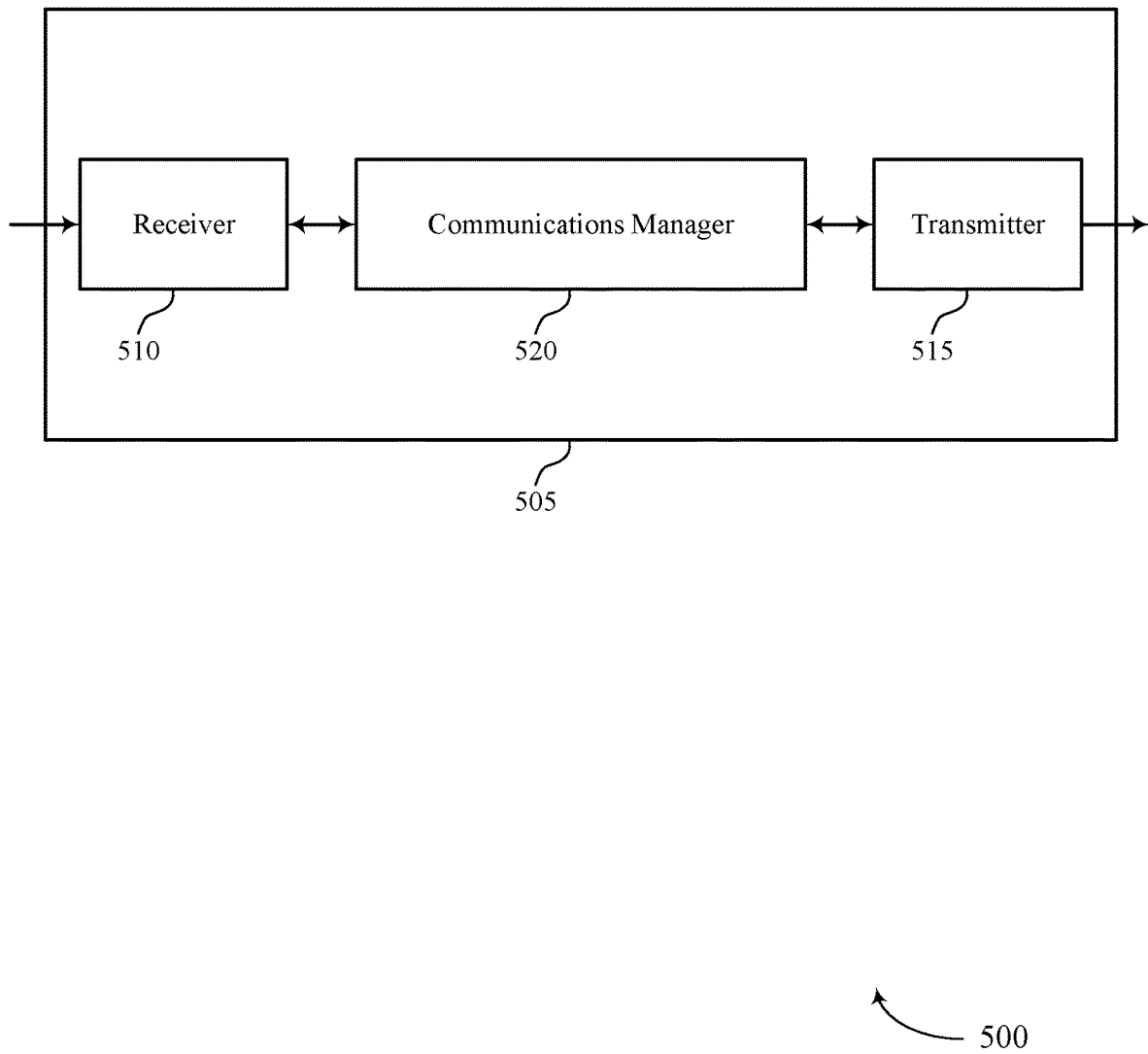
FIGS. 5 and 6 show block diagrams of devices that support reporting environmental states of a UE in accordance with one or more aspects of the present disclosure.

At 445, the node 405-a may potentially transmit signaling indicating parameters associated with a machine learning model to the UE 115-c. In some examples, the UE 115-c may utilize the parameters to update the machine learning model and implement the updated machine learning model to perform one or more wireless procedures. In some examples, the node 405-a may determine the parameters associated with the machine learning using the environmental state associated with the UE 115-c or the change in the environmental state associated with the UE 115-c indicated in the report FIG. 5 shows a block diagram 500 of a device 505 that supports reporting environmental states of a UE in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reporting environmental states of a UE). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reporting environmental states of a UE). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reporting environmental states of a UE as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving control signaling indicating a set of schemes for reporting an environmental state associated with the UE. The communications manager 520 may be configured as or otherwise support a means for measuring one or more channel characteristics according to a scheme of the set of schemes. The communications manager 520 may be configured as or otherwise support a means for transmitting a report indicating the environmental state associated with the UE based on measuring the one or more channel characteristics, where a machine learning model implemented by the UE, a network entity, or both is based on the indicated environmental state associated with the UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing and reduced power consumption. The techniques as described herein may allow a network entity to update a neural network model or determine a new neural network model based on an environmental state of the device 505 which may improve machine learning at the device 505 and thus, potentially improve procedures (e.g., beamforming procedures) for which the machine learning is applied.

Figure 6:
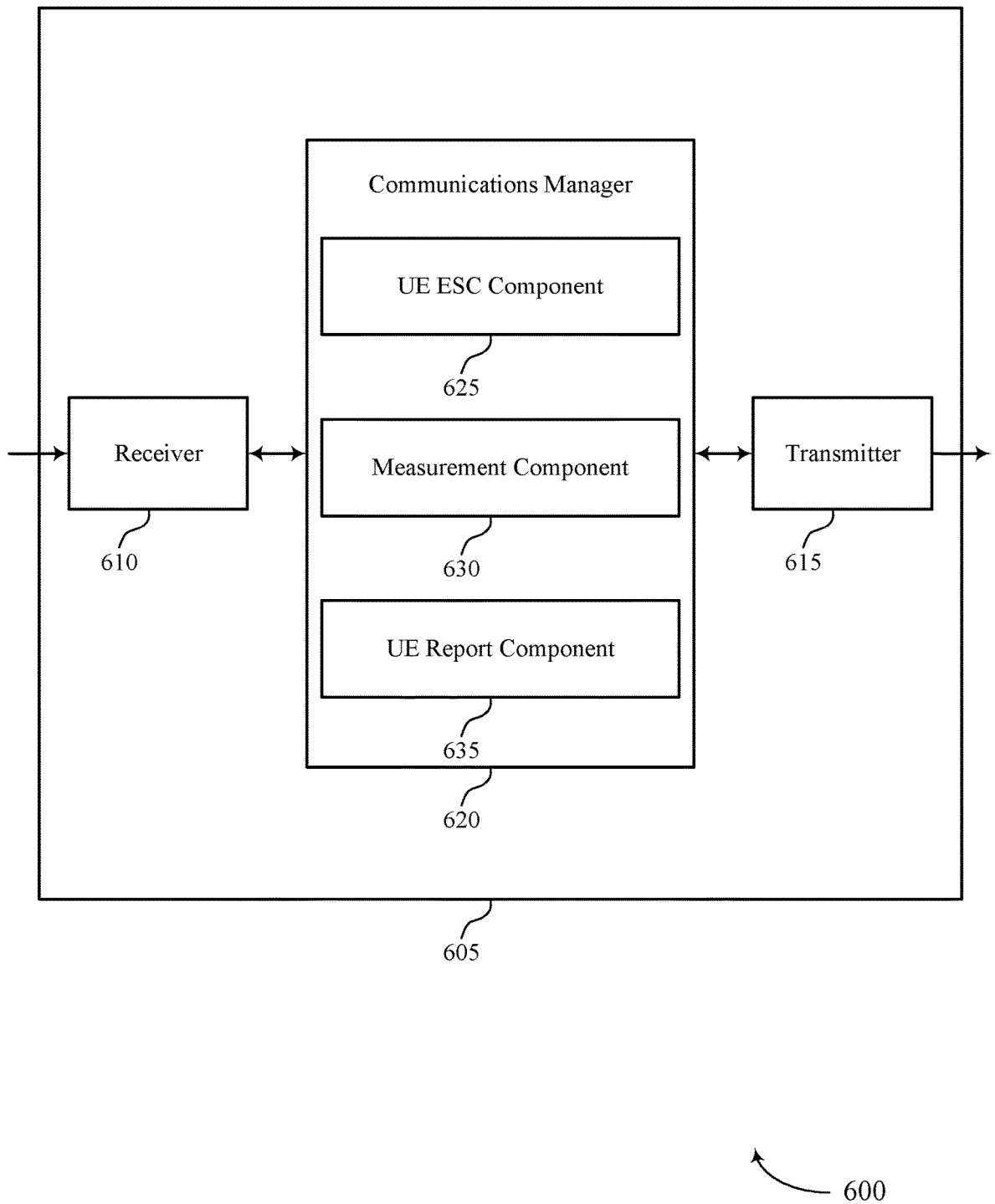

FIG. 6 shows a block diagram 600 of a device 605 that supports reporting environmental states of a UE in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reporting environmental states of a UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reporting environmental states of a UE). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reporting environmental states of a UE as described herein. For example, the communications manager 620 may include a UE ESC component 625, a measurement component 630, a UE report component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The UE ESC component 625 may be configured as or otherwise support a means for receiving control signaling indicating a set of schemes for reporting an environmental state associated with the UE. The measurement component 630 may be configured as or otherwise support a means for measuring one or more channel characteristics according to a scheme of the set of schemes. The UE report component 635 may be configured as or otherwise support a means for transmitting a report indicating the environmental state associated with the UE based on measuring the one or more channel characteristics, where a machine learning model implemented by the UE, a network entity, or both is based on the indicated environmental state associated with the UE.

Figure 7:
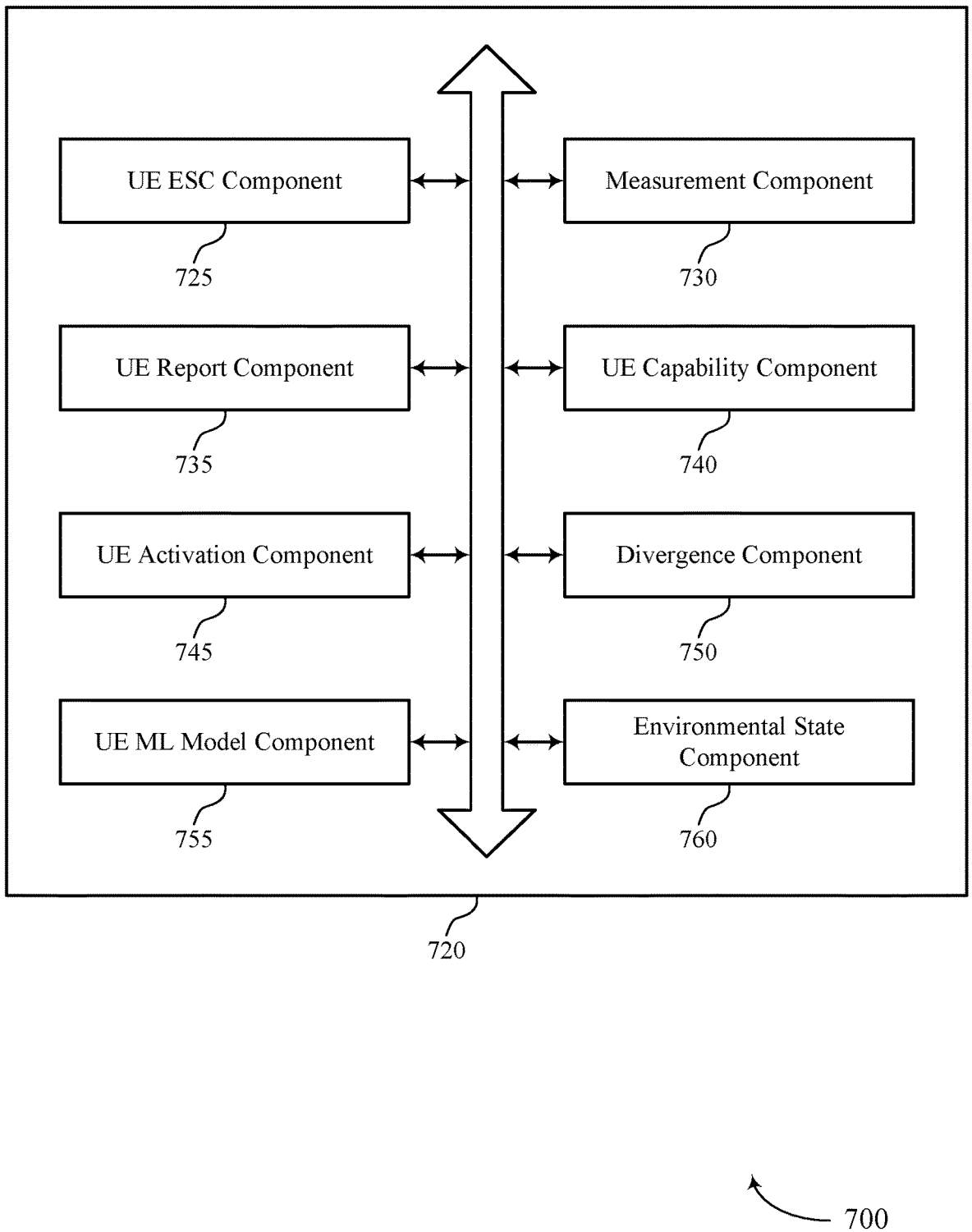
FIG. 7 shows a block diagram of a communications manager that supports reporting environmental states of a UE in accordance with one or more aspects of the present disclosure.

FIG. 7 shows a block diagram 700 of a communications manager 720 that supports reporting environmental states of a UE in accordance with one or more aspects of the present disclosure. The communications manager 720 may be an example of aspects of a communications manager 520, a communications manager 620, or both, as described herein. The communications manager 720, or various components thereof, may be an example of means for performing various aspects of reporting environmental states of a UE as described herein. For example, the communications manager 720 may include a UE ESC component 725, a measurement component 730, a UE report component 735, a UE capability component 740, a UE activation component 745, a divergence component 750, a UE ML model component 755, an environmental state component 760, or any combination thereof. Each of these components may communicate, directly or indirectly, with one another (e.g., via one or more buses).

The communications manager 720 may support wireless communication at a UE in accordance with examples as disclosed herein. The UE ESC component 725 may be configured as or otherwise support a means for receiving control signaling indicating a set of schemes for reporting an environmental state associated with the UE. The measurement component 730 may be configured as or otherwise support a means for measuring one or more channel characteristics according to a scheme of the set of schemes. The UE report component 735 may be configured as or otherwise support a means for transmitting a report indicating the environmental state associated with the UE based on measuring the one or more channel characteristics, where a machine learning model implemented by the UE, a network entity, or both is based on the indicated environmental state associated with the UE.

In some examples, the UE capability component 740 may be configured as or otherwise support a means for transmitting signaling indicating a capability of the UE to report the environmental state associated with the UE, where receiving the control signaling is based on transmitting the signaling.

In some examples, to support transmitting the signaling indicating the capability, the UE capability component 740 may be configured as or otherwise support a means for transmitting RRC signaling indicating the capability of the UE to report the environmental state associated with the UE, the RRC signaling including an indication of the capability of the UE to measure the one or more channel characteristics, one or more second channel characteristics supported by the UE, one or more techniques for detecting a change to the one or more channel characteristics supported by the UE, a set of resources for monitoring the one or more channel characteristics supported by the UE, a periodicity associated with the set of resources supported by the UE, or any combination thereof.

In some examples, to support receiving the control signaling indicating the set of schemes for reporting the environmental state associated with the UE, the UE ESC component 725 may be configured as or otherwise support a means for receiving RRC signaling indicating the set of schemes for reporting the environmental state associated with the UE, the RRC signaling including an indication of an identifier, a set of resources for measuring the one or more channel characteristics, a type of reference signal to be received over the set of resources, one or more second channel characteristics, a periodicity associated with the set of resources, a periodicity associated with transmitting the report, a trigger event corresponding to transmitting the report, one or more techniques for detecting a change to the environmental state, or a threshold associated with the one or more techniques for each respective scheme of the set of schemes.

In some examples, the UE activation component 745 may be configured as or otherwise support a means for receiving a MAC-CE that activates a subset of the set of schemes for reporting the environmental state associated with the UE, where measuring the one or more channel characteristics is based on receiving the MAC-CE.

In some examples, the UE activation component 745 may be configured as or otherwise support a means for receiving DCI that activates the scheme of the set of schemes for reporting the environmental state associated with the UE, where measuring the one or more channel characteristics is based on receiving the DCI.

In some examples, to support transmitting the report indicating the environmental state associated with the UE, the UE report component 735 may be configured as or otherwise support a means for transmitting UCI including the report.

In some examples, the divergence component 750 may be configured as or otherwise support a means for comparing the one or more channel characteristics with one or more second channel characteristics that are stored at the UE. In some examples, the divergence component 750 may be configured as or otherwise support a means for determining that a divergence parameter between the one or more channel characteristics and the one or more second channel characteristics satisfies a threshold, where transmitting the report is based on the divergence parameter satisfying the threshold.

In some examples, to support comparing the one or more channel characteristics with the one or more second channel characteristics, the divergence component 750 may be configured as or otherwise support a means for determining the divergence parameter between the one or more channel characteristics and the one or more second channel characteristics, where transmitting the report is based on the divergence parameter between the one or more channel characteristics and the one or more second channel characteristics exceeding the threshold.

In some examples, the UE ML model component 755 may be configured as or otherwise support a means for receiving, based on transmitting the report, signaling indicating one or more parameters associated with the machine learning model.

In some examples, the UE ML model component 755 may be configured as or otherwise support a means for implementing the machine learning model to perform one or more wireless procedures based on the one or more parameters associated with the machine learning model.

In some examples, the environmental state component 760 may be configured as or otherwise support a means for determining the environmental state associated with the UE based on the one or more channel characteristics, where the one or more channel characteristics include a RSRP, a SINR, a Doppler delay, a delay spread, an angle of arrival of a received signal, an angle of departure of a transmitted signal, or any combination thereof.

In some examples, the environmental state component 760 may be configured as or otherwise support a means for determining the environmental state associated with the UE based on one or more sensor outputs, where the one or more sensor outputs include a velocity of the UE, a location of the UE relative to the network entity, an orientation of the UE, or any combination thereof.

In some examples, the environmental state includes conditions of radio frequency signals that surround the UE.

Figure 8:
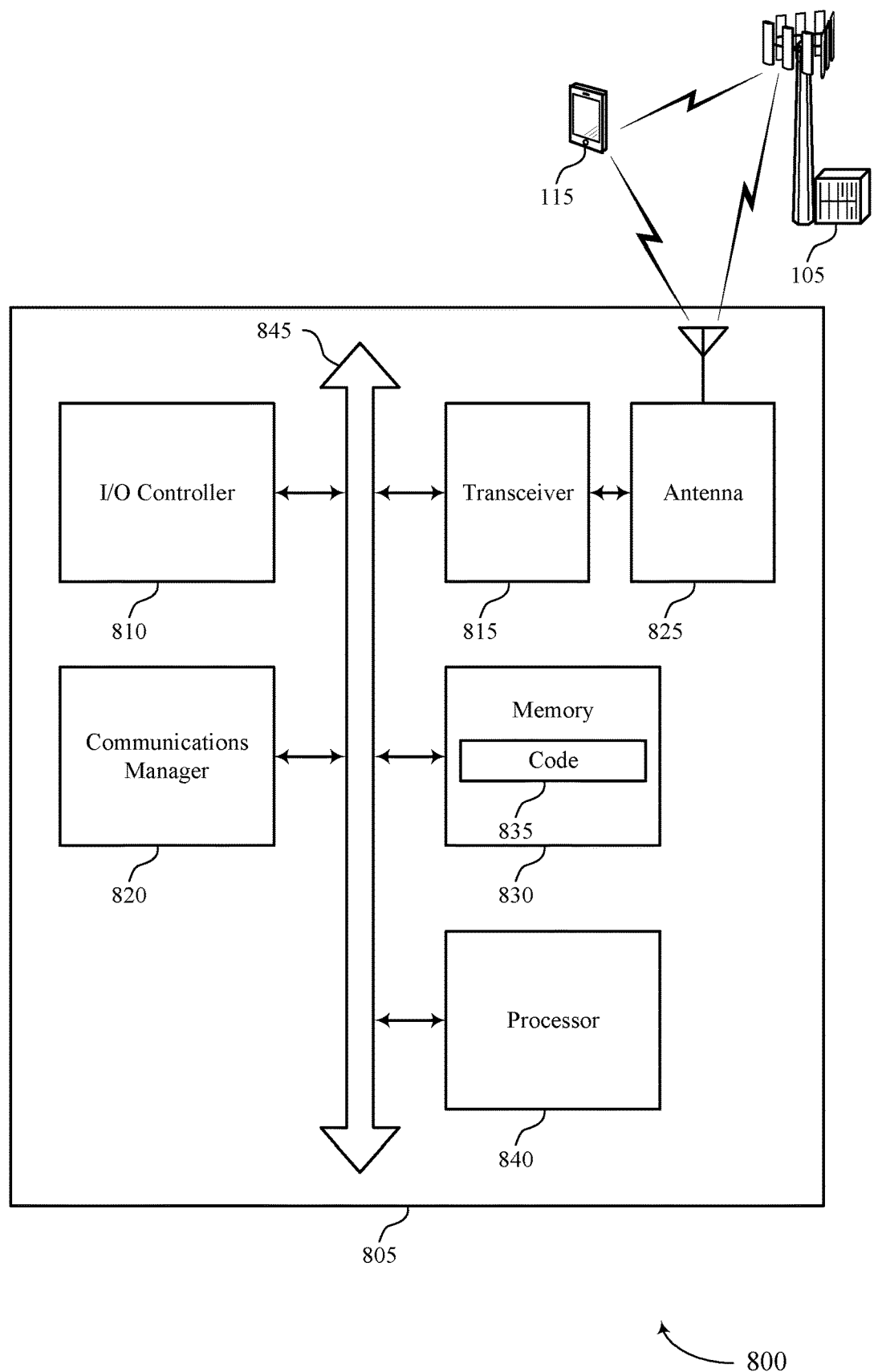
FIG. 8 shows a diagram of a system including a device that supports reporting environmental states of a UE in accordance with one or more aspects of the present disclosure.

FIG. 8 shows a diagram of a system 800 including a device 805 that supports reporting environmental states of a UE in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reporting environmental states of a UE). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a set of schemes for reporting an environmental state associated with the UE. The communications manager 820 may be configured as or otherwise support a means for measuring one or more channel characteristics according to a scheme of the set of schemes. The communications manager 820 may be configured as or otherwise support a means for transmitting a report indicating the environmental state associated with the UE based on measuring the one or more channel characteristics, where a machine learning model implemented by the UE, a network entity, or both is based on the indicated environmental state associated with the UE.

By including or configuring the communications manager 820 in accordance with examples as described herein, the device 805 may support techniques for improved user experience related to reduced processing, reduced power consumption, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reporting environmental states of a UE as described herein, or the processor 840 and the memory 830 may be otherwise configured to perform or support such operations.

Figure 9:
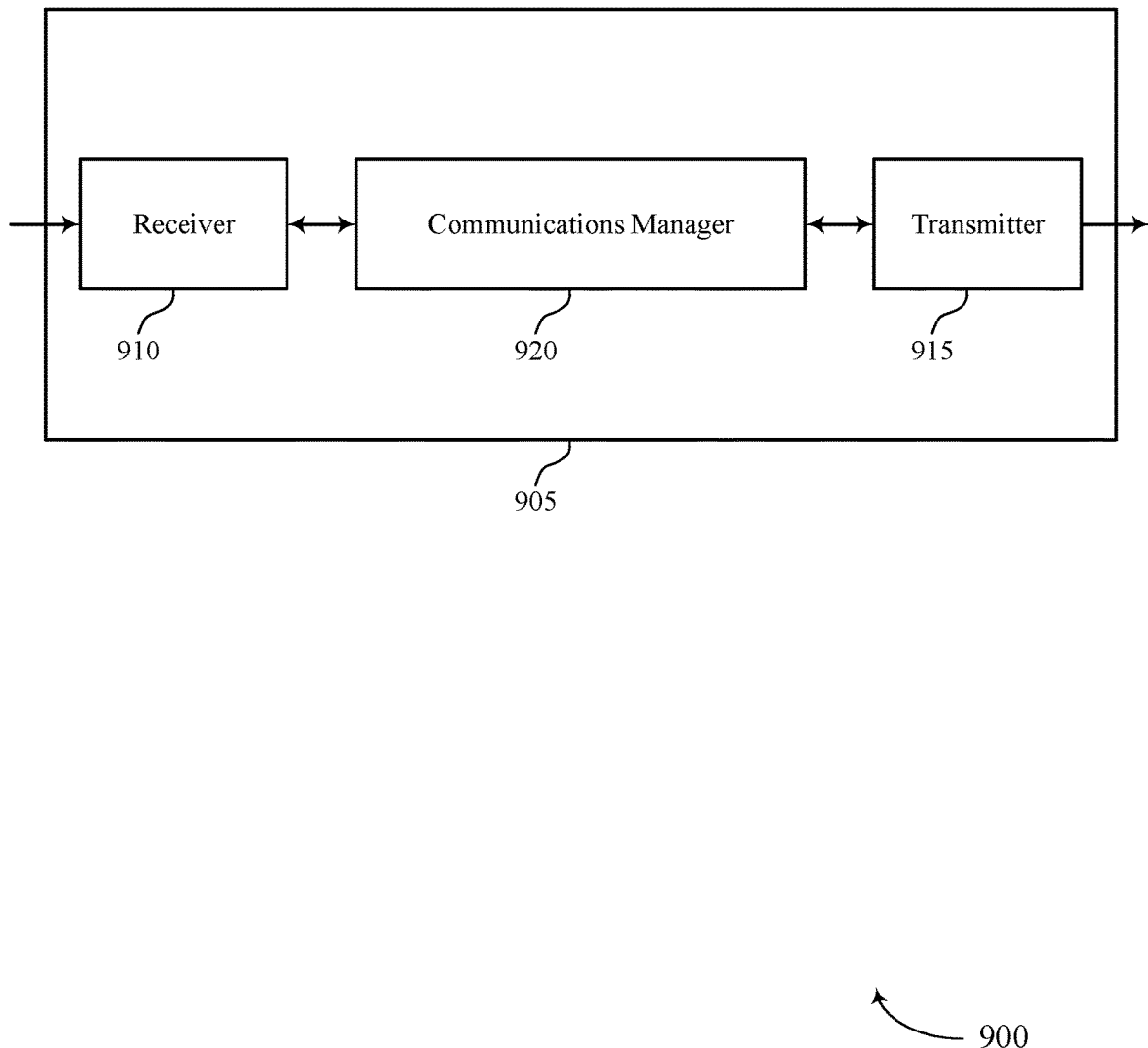
FIGS. 9 and 10 show block diagrams of devices that support reporting environmental states of a UE in accordance with one or more aspects of the present disclosure.

FIG. 9 shows a block diagram 900 of a device 905 that supports reporting environmental states of a UE in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of reporting environmental states of a UE as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting control signaling indicating a set of schemes for reporting an environmental state associated with a UE. The communications manager 920 may be configured as or otherwise support a means for receiving a report indicating the environmental state associated with the UE based on the control signaling, where a machine learning model implemented by the UE, the network entity, or both is based on the indicated environmental state associated with the UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and reduced power consumption.

Figure 10:
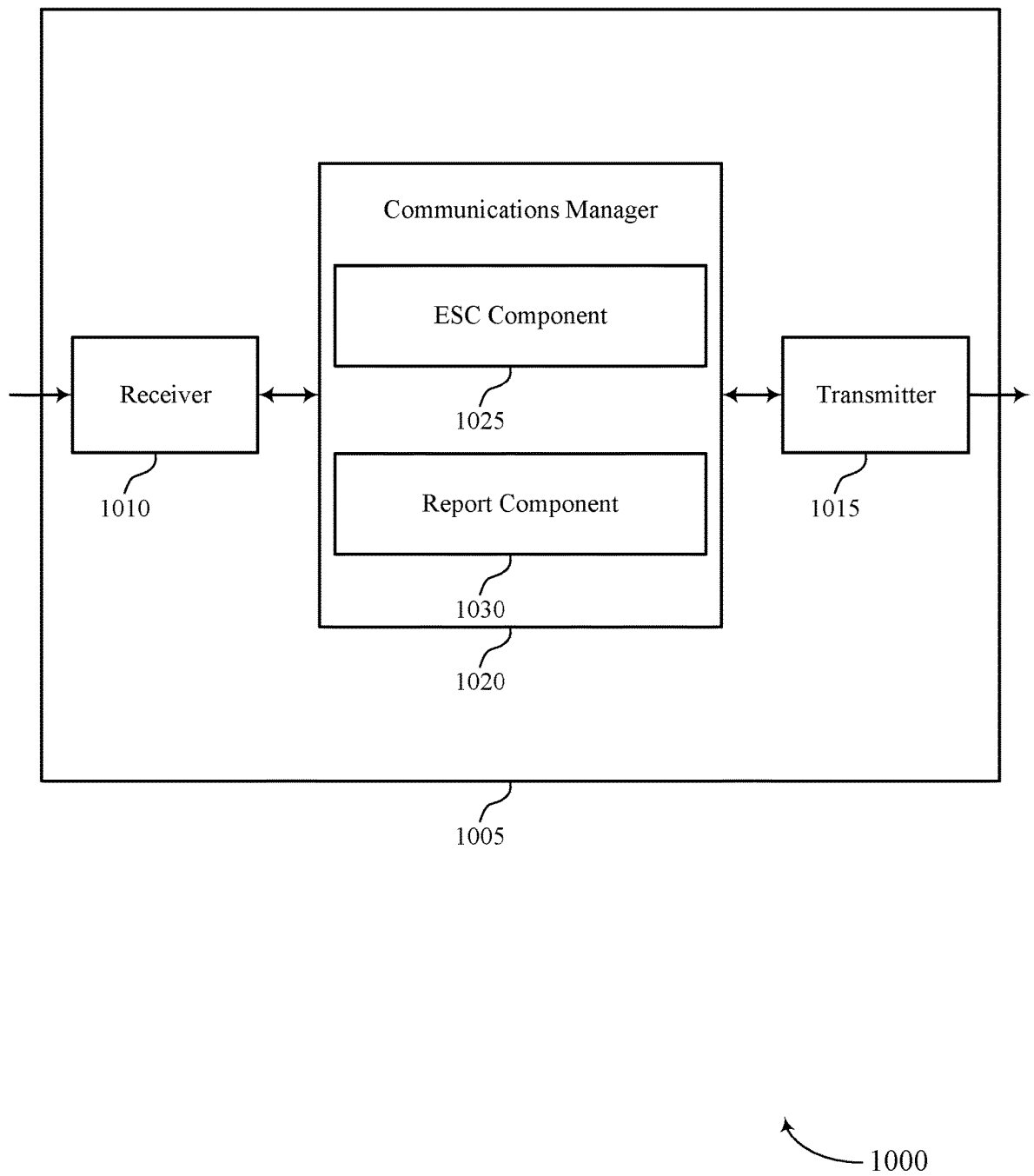

FIG. 10 shows a block diagram 1000 of a device 1005 that supports reporting environmental states of a UE in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of reporting environmental states of a UE as described herein. For example, the communications manager 1020 may include an ESC component 1025 a report component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The ESC component 1025 may be configured as or otherwise support a means for transmitting control signaling indicating a set of schemes for reporting an environmental state associated with a UE. The report component 1030 may be configured as or otherwise support a means for receiving a report indicating the environmental state associated with the UE based on the control signaling, where a machine learning model implemented by the UE, the network entity, or both is based on the indicated environmental state associated with the UE.

Figure 11:
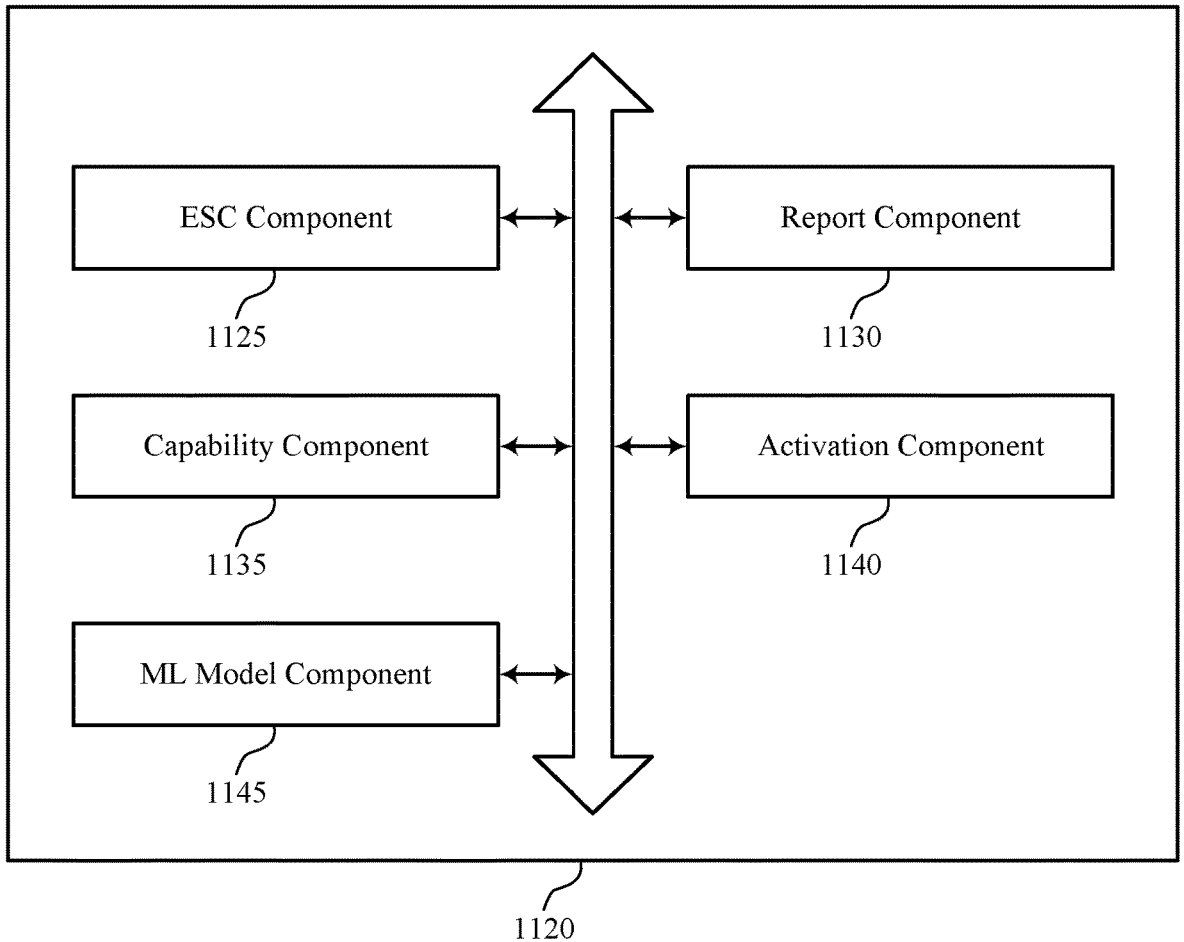
FIG. 11 shows a block diagram of a communications manager that supports reporting environmental states of a UE in accordance with one or more aspects of the present disclosure.

FIG. 11 shows a block diagram 1100 of a communications manager 1120 that supports reporting environmental states of a UE in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of reporting environmental states of a UE as described herein. For example, the communications manager 1120 may include an ESC component 1125, a report component 1130, a capability component 1135, an activation component 1140, an ML model component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The ESC component 1125 may be configured as or otherwise support a means for transmitting control signaling indicating a set of schemes for reporting an environmental state associated with a UE. The report component 1130 may be configured as or otherwise support a means for receiving a report indicating the environmental state associated with the UE based on the control signaling, where a machine learning model implemented by the UE, the network entity, or both is based on the indicated environmental state associated with the UE.

In some examples, the capability component 1135 may be configured as or otherwise support a means for receiving, from the UE, signaling indicating a capability of the UE to report the environmental state associated with the UE, where transmitting the control signaling is based on receiving the signaling.

In some examples, to support receiving the signaling indicating the capability, the capability component 1135 may be configured as or otherwise support a means for receiving RRC signaling indicating the capability of the UE to report the environmental state associated with the UE, the RRC signaling including an indication of the capability of the UE to measure to one or more channel characteristics, one or more second channel characteristics supported by the UE, one or more techniques for detecting a change to the one or more channel characteristics supported by the UE, a set of resources for measuring the one or more channel characteristics supported by the UE, a periodicity associated with the set of resources supported by the UE, or any combination thereof.

In some examples, to support transmitting the control signaling indicating the set of schemes for reporting the environmental state associated with the UE, the ESC component 1125 may be configured as or otherwise support a means for transmitting RRC signaling indicating the set of schemes for reporting the environmental state associated with the UE, the RRC signaling including an indication of an identifier, a set of resources for measuring for one or more channel characteristics, a type of reference signals to be received over the set of resources, one or more second channel characteristics, a periodicity associated with the set of resources, a periodicity associated with transmitting the report, one or more techniques for detecting a change to the environmental state, or a threshold associated with the one or more techniques for each respective scheme of the set of schemes.

In some examples, the activation component 1140 may be configured as or otherwise support a means for transmitting a MAC-CE that activates a subset of the set of schemes for reporting the environmental state associated with the UE.

In some examples, the activation component 1140 may be configured as or otherwise support a means for transmitting DCI that activates a scheme of the set of schemes for reporting the environmental state associated with the UE.

In some examples, to support receiving the report indicating the environmental state associated with the UE, the report component 1130 may be configured as or otherwise support a means for receiving UCI including the report.

In some examples, the ML model component 1145 may be configured as or otherwise support a means for updating a second machine learning model based on the environmental state associated with the UE, where the updated second machine learning model includes the machine learning model. In some examples, the ML model component 1145 may be configured as or otherwise support a means for transmitting signaling indicating one or more parameters associated with the machine learning model.

In some examples, the environmental state associated with the UE is based on one or more channel characteristics. In some examples, the one or more channel characteristics include a RSRP, a SINR, a Doppler delay, a delay spread, an angle of arrival of a received signal, an angle of departure of a transmitted signal, or any combination thereof.

In some examples, the environmental state associated with the UE is based on one or more sensor outputs. In some examples, the one or more sensor outputs include a velocity of the UE, a location of the UE relative to the network entity, an orientation of the UE, or any combination thereof.

In some examples, the environmental state includes conditions of radio frequency signals that surround the UE.

Figure 12:
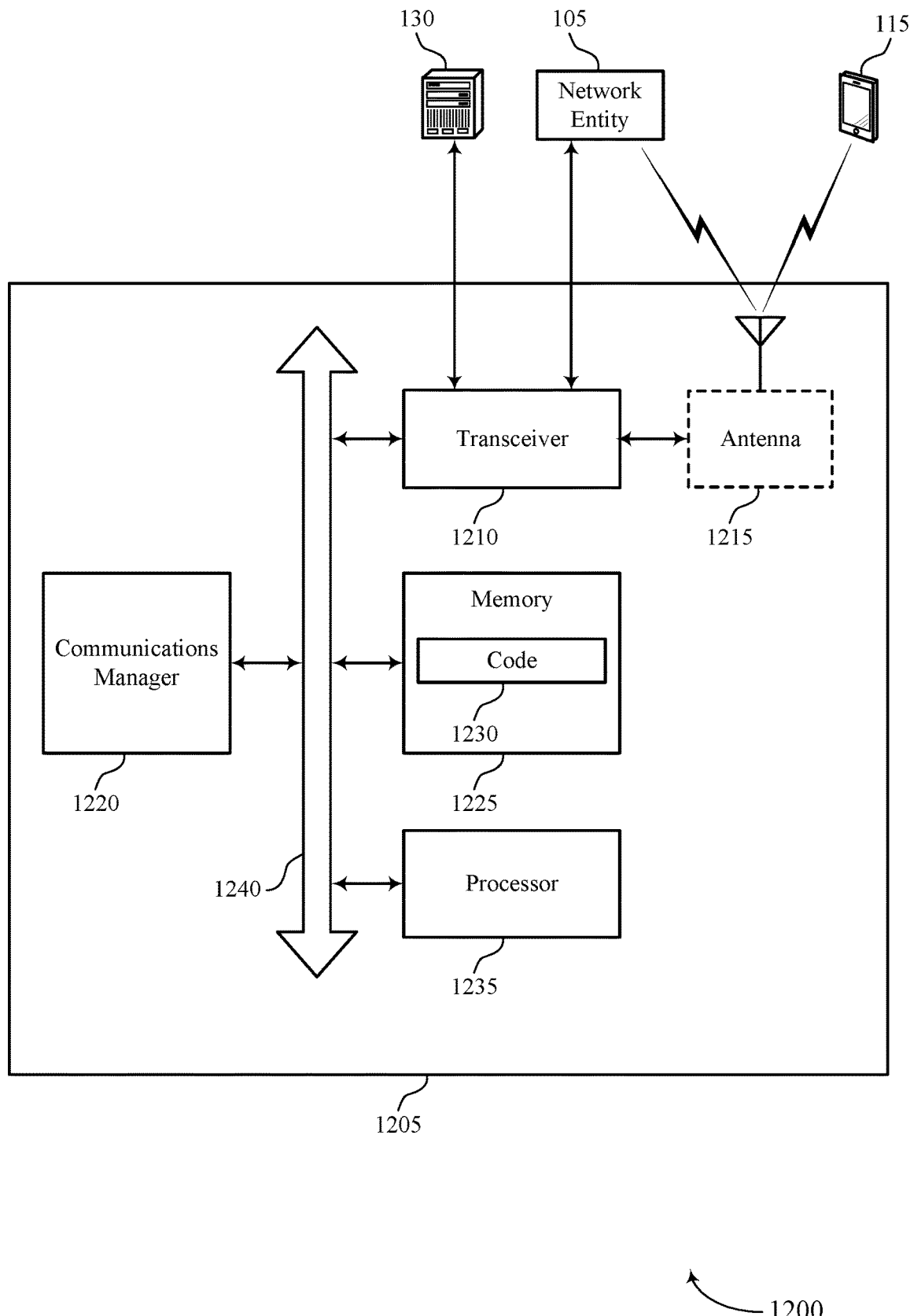
FIG. 12 shows a diagram of a system including a device that supports reporting environmental states of a UE in accordance with one or more aspects of the present disclosure.

FIG. 12 shows a diagram of a system 1200 including a device 1205 that supports reporting environmental states of a UE in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor

1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting reporting environmental states of a UE). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting control signaling indicating a set of schemes for reporting an environmental state associated with a UE. The communications manager 1220 may be configured as or otherwise support a means for receiving a report indicating the environmental state associated with the UE based on the control signaling, where a machine learning model implemented by the UE, the network entity, or both is based on the indicated environmental state associated with the UE.

By including or configuring the communications manager 1220 in accordance with examples as described herein, the device 1205 may support techniques for improved user experience related to reduced processing, reduced power consumption, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of reporting environmental states of a UE as described herein, or the processor 1235 and the memory 1225 may be otherwise configured to perform or support such operations.

Figure 13:
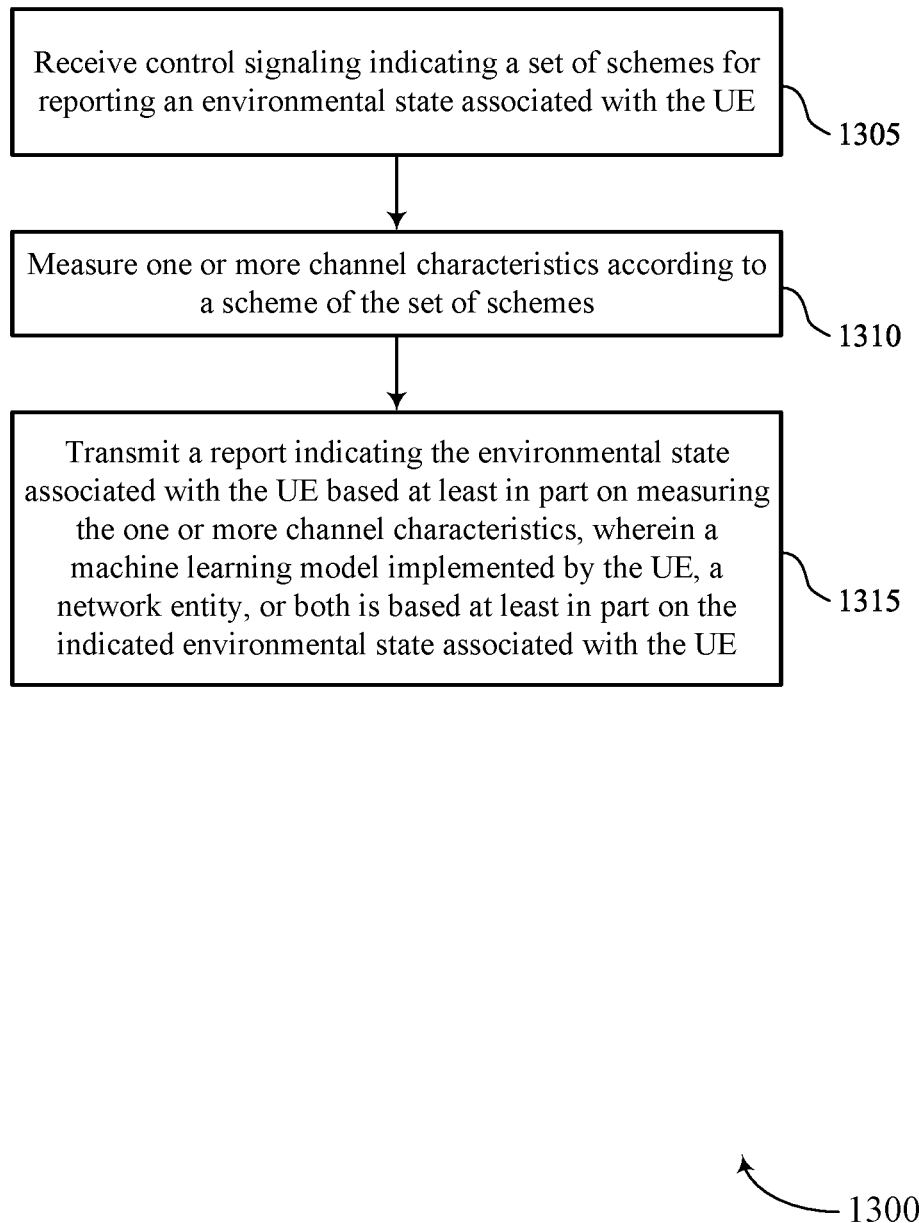
FIGS. 13 through 18 show flowcharts illustrating methods that support reporting environmental states of a UE in accordance with one or more aspects of the present disclosure.

FIG. 13 shows a flowchart illustrating a method 1300 that supports reporting environmental states of a UE in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a set of schemes for reporting an environmental state associated with the UE. The operations of 1305 may be performed in accordance with examples as disclosed herein. In some examples, aspects of the operations of 1305 may be performed by a UE ESC component 725 as described with reference to FIG. 7.

At 1310, the method may include measuring one or more channel characteristics according to a scheme of the set of schemes. The operations of 1310 may be performed in accordance with examples as disclosed herein. In some examples, aspects of the operations of 1310 may be performed by a measurement component 730 as described with reference to FIG. 7.

At 1315, the method may include transmitting a report indicating the environmental state associated with the UE based on measuring the one or more channel characteristics, where a machine learning model implemented by the UE, a network entity, or both is based on the indicated environmental state associated with the UE. The operations of 1315 may be performed in accordance with examples as disclosed herein. In some examples, aspects of the operations of 1315 may be performed by a UE report component 735 as described with reference to FIG. 7.

Figure 14:
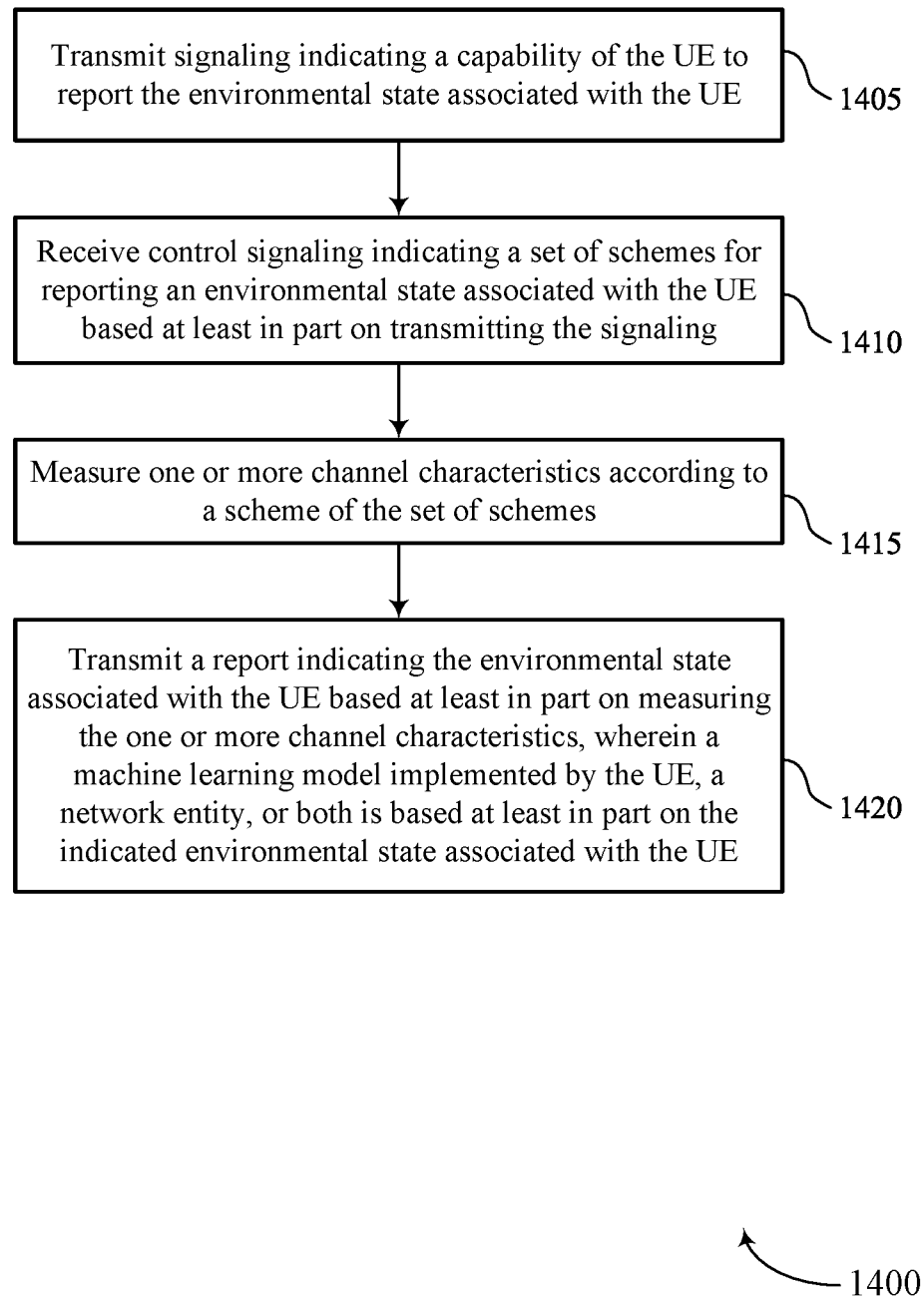

FIG. 14 shows a flowchart illustrating a method 1400 that supports reporting environmental states of a UE in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting signaling indicating a capability of the UE to report the environmental state associated with the UE. The operations of 1405 may be performed in accordance with examples as disclosed herein. In some examples, aspects of the operations of 1405 may be performed by a UE capability component 740 as described with reference to FIG. 7.

At 1410, the method may include receiving control signaling indicating a set of schemes for reporting an environmental state associated with the UE based on transmitting the signaling. The operations of 1410 may be performed in accordance with examples as disclosed herein. In some examples, aspects of the operations of 1410 may be performed by a UE ESC component 725 as described with reference to FIG. 7.

At 1415, the method may include measuring one or more channel characteristics according to a scheme of the set of schemes. The operations of 1415 may be performed in accordance with examples as disclosed herein. In some examples, aspects of the operations of 1415 may be performed by a measurement component 730 as described with reference to FIG. 7.

At 1420, the method may include transmitting a report indicating the environmental state associated with the UE based on measuring the one or more channel characteristics, where a machine learning model implemented by the UE, a network entity, or both is based on the indicated environmental state associated with the UE. The operations of 1420 may be performed in accordance with examples as disclosed herein. In some examples, aspects of the operations of 1420 may be performed by a UE report component 735 as described with reference to FIG. 7.

Figure 15:
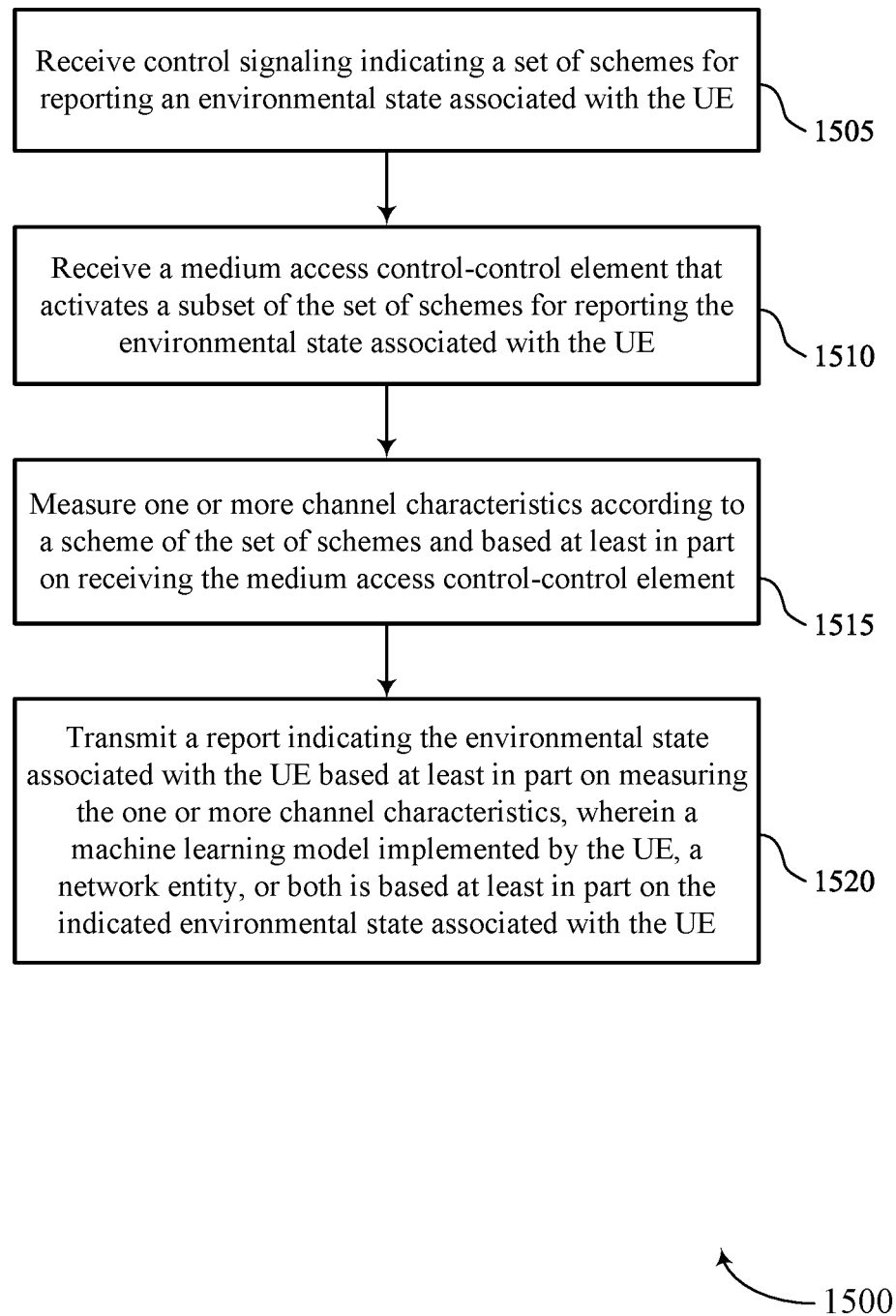

FIG. 15 shows a flowchart illustrating a method 1500 that supports reporting environmental states of a UE in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a set of schemes for reporting an environmental state associated with the UE. The operations of 1505 may be performed in accordance with examples as disclosed herein. In some examples, aspects of the operations of 1505 may be performed by a UE ESC component 725 as described with reference to FIG. 7.

At 1510, the method may include receiving a MAC-CE that activates a subset of the set of schemes for reporting the environmental state associated with the UE. The operations of 1510 may be performed in accordance with examples as disclosed herein. In some examples, aspects of the operations of 1510 may be performed by a UE activation component 745 as described with reference to FIG. 7.

At 1515, the method may include measuring one or more channel characteristics according to a scheme of the set of schemes and based on receiving the MAC-CE. The operations of 1515 may be performed in accordance with examples as disclosed herein. In some examples, aspects of the operations of 1515 may be performed by a measurement component 730 as described with reference to FIG. 7.

At 1520, the method may include transmitting a report indicating the environmental state associated with the UE based on measuring the one or more channel characteristics, where a machine learning model implemented by the UE, a network entity, or both is based on the indicated environmental state associated with the UE. The operations of 1520 may be performed in accordance with examples as disclosed herein. In some examples, aspects of the operations of 1520 may be performed by a UE report component 735 as described with reference to FIG. 7.

Figure 16:
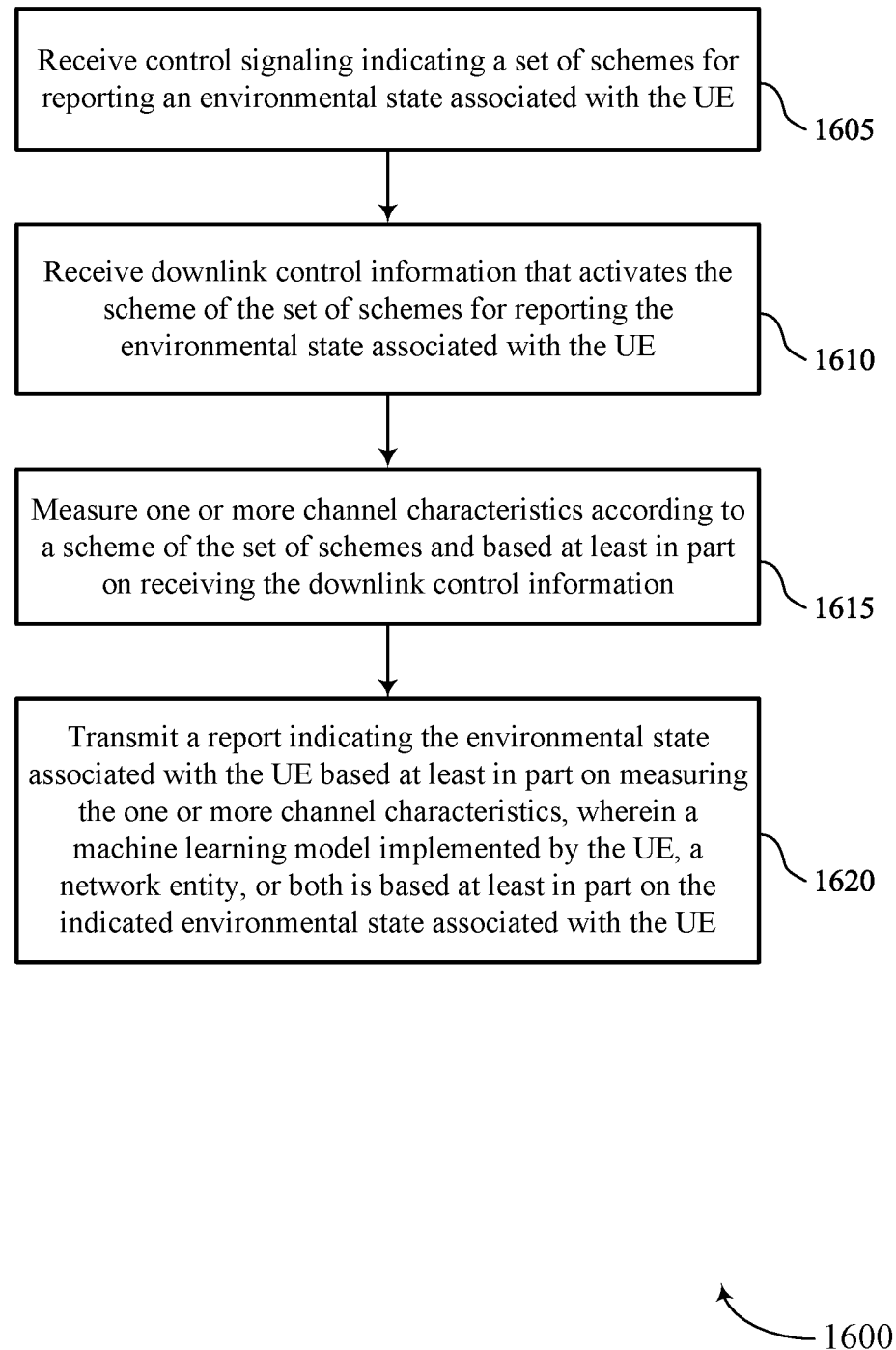

FIG. 16 shows a flowchart illustrating a method 1600 that supports reporting environmental states of a UE in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a set of schemes for reporting an environmental state associated with the UE. The operations of 1605 may be performed in accordance with examples as disclosed herein. In some examples, aspects of the operations of 1605 may be performed by a UE ESC component 725 as described with reference to FIG. 7.

At 1610, the method may include receiving DCI that activates the scheme of the set of schemes for reporting the environmental state associated with the UE. The operations of 1610 may be performed in accordance with examples as disclosed herein. In some examples, aspects of the operations of 1610 may be performed by a UE activation component 745 as described with reference to FIG. 7.

At 1615, the method may include measuring one or more channel characteristics according to a scheme of the set of schemes and based on receiving the DCI. The operations of 1615 may be performed in accordance with examples as disclosed herein. In some examples, aspects of the operations of 1615 may be performed by a measurement component 730 as described with reference to FIG. 7.

At 1620, the method may include transmitting a report indicating the environmental state associated with the UE based on measuring the one or more channel characteristics, where a machine learning model implemented by the UE, a network entity, or both is based on the indicated environmental state associated with the UE. The operations of 1620 may be performed in accordance with examples as disclosed herein. In some examples, aspects of the operations of 1620 may be performed by a UE report component 735 as described with reference to FIG. 7.

Figure 17:
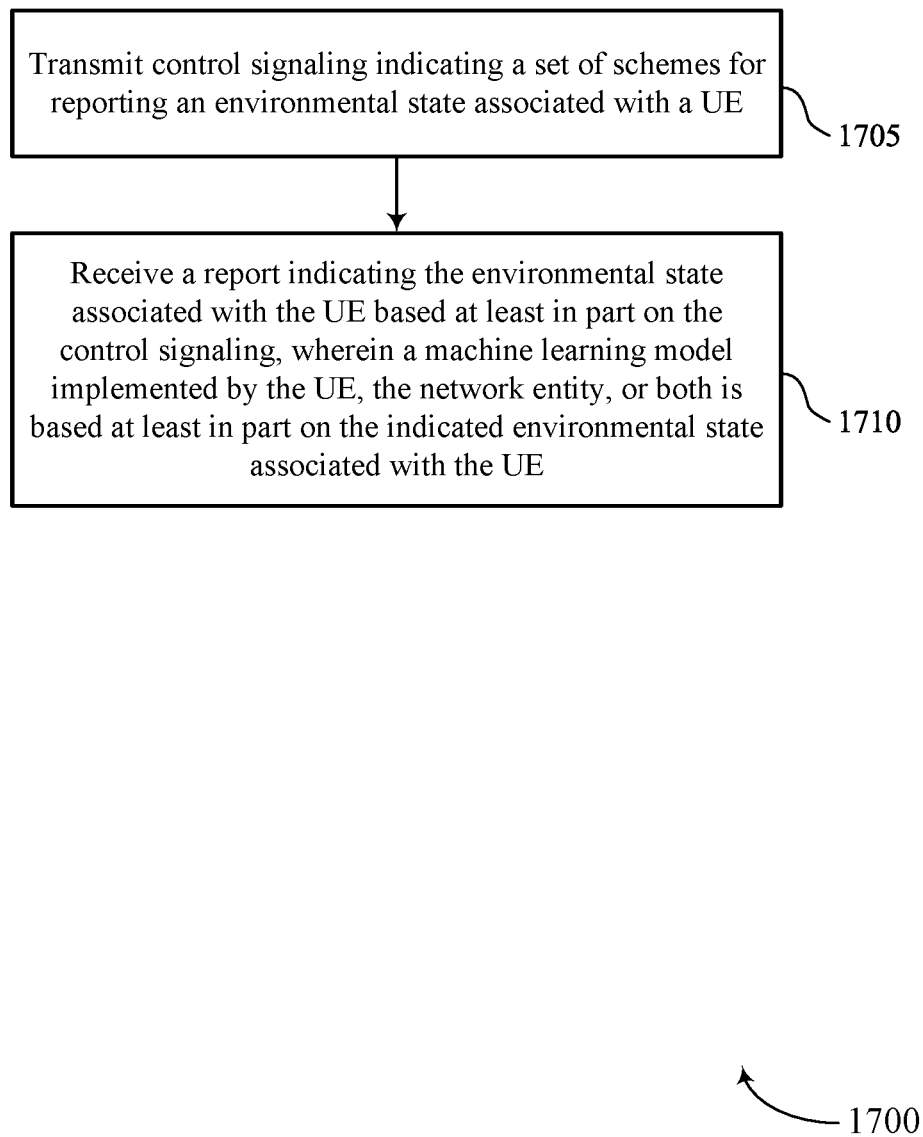

FIG. 17 shows a flowchart illustrating a method 1700 that supports reporting environmental states of a UE in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling indicating a set of schemes for reporting an environmental state associated with a UE. The operations of 1705 may be performed in accordance with examples as disclosed herein. In some examples, aspects of the operations of 1705 may be performed by an ESC component 1125 as described with reference to FIG. 11.

At 1710, the method may include receiving a report indicating the environmental state associated with the UE based on the control signaling, where a machine learning model implemented by the UE, the network entity, or both is based on the indicated environmental state associated with the UE. The operations of 1710 may be performed in accordance with examples as disclosed herein. In some examples, aspects of the operations of 1710 may be performed by a report component 1130 as described with reference to FIG. 11.

Figure 18:
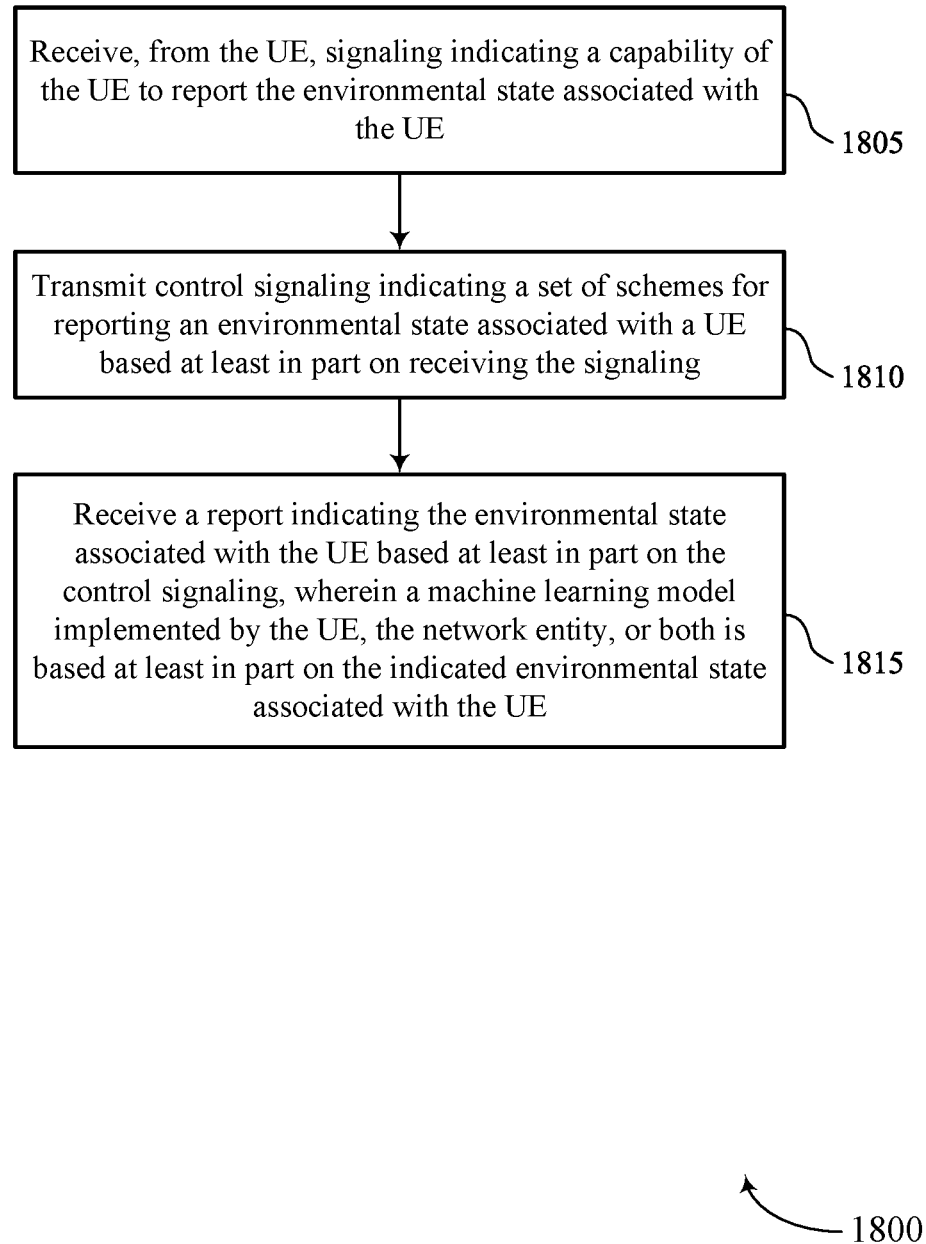

FIG. 18 shows a flowchart illustrating a method 1800 that supports reporting environmental states of a UE in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from the UE, signaling indicating a capability of the UE to report the environmental state associated with the UE. The operations of 1805 may be performed in accordance with examples as disclosed herein. In some examples, aspects of the operations of 1805 may be performed by a capability component 1135 as described with reference to FIG. 11.

At 1810, the method may include transmitting control signaling indicating a set of schemes for reporting an environmental state associated with a UE based on receiving the signaling. The operations of 1810 may be performed in accordance with examples as disclosed herein. In some examples, aspects of the operations of 1810 may be performed by an ESC component 1125 as described with reference to FIG. 11.

At 1815, the method may include receiving a report indicating the environmental state associated with the UE based on the control signaling, where a machine learning model implemented by the UE, the network entity, or both is based on the indicated environmental state associated with the UE. The operations of 1815 may be performed in accordance with examples as disclosed herein. In some examples, aspects of the operations of 1815 may be performed by a report component 1130 as described with reference to FIG. 11.

The following provides an overview of aspects of the present disclosure:

Aspect 1: A method for wireless communication at a UE, comprising: receiving control signaling indicating a set of schemes for reporting an environmental state associated with the UE; measuring one or more channel characteristics according to a scheme of the set of schemes; and transmitting a report indicating the environmental state associated with the UE based at least in part on measuring the one or more channel characteristics, wherein a machine learning model implemented by the UE, a network entity, or both is based at least in part on the indicated environmental state associated with the UE.

Aspect 2: The method of aspect 1, further comprising: transmitting signaling indicating a capability of the UE to report the environmental state associated with the UE, wherein receiving the control signaling is based at least in part on transmitting the signaling.

Aspect 3: The method of aspect 2, wherein transmitting the signaling indicating the capability comprises: transmitting RRC signaling indicating the capability of the UE to report the environmental state associated with the UE, the RRC signaling comprising an indication of the capability of the UE to measure the one or more channel characteristics, one or more second channel characteristics supported by the UE, one or more techniques for detecting a change to the one or more channel characteristics supported by the UE, a set of resources for monitoring the one or more channel characteristics supported by the UE, a periodicity associated with the set of resources supported by the UE, or any combination thereof.

Aspect 4: The method of any of aspects 1 through 3, wherein receiving the control signaling indicating the set of schemes for reporting the environmental state associated with the UE comprises: receiving RRC signaling indicating the set of schemes for reporting the environmental state associated with the UE, the RRC signaling comprising an indication of an ID, a set of resources for measuring the one or more channel characteristics, a type of reference signal to be received over the set of resources, one or more second channel characteristics, a periodicity associated with the set of resources, a periodicity associated with transmitting the report, a trigger event corresponding to transmitting the report, one or more techniques for detecting a change to the environmental state, or a threshold associated with the one or more techniques for each respective scheme of the set of schemes.

Aspect 5: The method of any of aspects 1 through 4, further comprising: receiving a MAC-CE that activates a subset of the set of schemes for reporting the environmental state associated with the UE, wherein measuring the one or more channel characteristics is based at least in part on receiving the MAC-CE.

Aspect 6: The method of any of aspects 1 through 4, further comprising: receiving DCI that activates the scheme of the set of schemes for reporting the environmental state associated with the UE, wherein measuring the one or more channel characteristics is based at least in part on receiving the DCI.

Aspect 7: The method of any of aspects 1 through 6, wherein transmitting the report indicating the environmental state associated with the UE comprises: transmitting UCI comprising the report.

Aspect 8: The method of any of aspects 1 through 7, further comprising: comparing the one or more channel characteristics with one or more second channel characteristics that are stored at the UE; and determining that a divergence parameter between the one or more channel characteristics and the one or more second channel characteristics satisfies a threshold, wherein transmitting the report is based at least in part on the divergence parameter satisfying the threshold.

Aspect 9: The method of aspect 8, wherein comparing the one or more channel characteristics with the one or more second channel characteristics comprises: determining the divergence parameter between the one or more channel characteristics and the one or more second channel characteristics, wherein transmitting the report is based at least in part on the divergence parameter between the one or more channel characteristics and the one or more second channel characteristics exceeding the threshold.

Aspect 10: The method of any of aspects 1 through 9, further comprising: receiving, based at least in part on transmitting the report, signaling indicating one or more parameters associated with the machine learning model.

Aspect 11: The method of aspect 10, further comprising: implementing the machine learning model to perform one or more wireless procedures based at least in part on the one or more parameters associated with the machine learning model.

Aspect 12: The method of any of aspects 1 through 11, further comprising: determining the environmental state associated with the UE based at least in part on the one or more channel characteristics, wherein the one or more channel characteristics comprise an RSRP, an SINR, a Doppler delay, a delay spread, an angle of arrival of a received signal, an angle of departure of a transmitted signal, or any combination thereof.

Aspect 13: The method of any of aspects 1 through 12, further comprising: determining the environmental state associated with the UE based at least in part on one or more sensor outputs, wherein the one or more sensor outputs comprise a velocity of the UE, a location of the UE relative to the network entity, an orientation of the UE, or any combination thereof.

Aspect 14: The method of any of aspects 1 through 13, wherein the environmental state comprises conditions of radio frequency signals that surround the UE.

Aspect 15: A method for wireless communication at a network entity, comprising: transmitting control signaling indicating a set of schemes for reporting an environmental state associated with a UE; and receiving a report indicating the environmental state associated with the UE based at least in part on the control signaling, wherein a machine learning model implemented by the UE, the network entity, or both is based at least in part on the indicated environmental state associated with the UE.

Aspect 16: The method of aspect 15, further comprising: receiving, from the UE, signaling indicating a capability of the UE to report the environmental state associated with the UE, wherein transmitting the control signaling is based at least in part on receiving the signaling.

Aspect 17: The method of aspect 16, wherein receiving the signaling indicating the capability comprises: receiving RRC signaling indicating the capability of the UE to report the environmental state associated with the UE, the RRC signaling comprising an indication of the capability of the UE to measure to one or more channel characteristics, one or more second channel characteristics supported by the UE, one or more techniques for detecting a change to the one or more channel characteristics supported by the UE, a set of resources for measuring the one or more channel characteristics supported by the UE, a periodicity associated with the set of resources supported by the UE, or any combination thereof.

Aspect 18: The method of any of aspects 15 through 17, wherein transmitting the control signaling indicating the set of schemes for reporting the environmental state associated with the UE comprises: transmitting RRC signaling indicating the set of schemes for reporting the environmental state associated with the UE, the RRC signaling comprising an indication of an ID, a set of resources for measuring for one or more channel characteristics, a type of reference signals to be received over the set of resources, one or more second channel characteristics, a periodicity associated with the set of resources, a periodicity associated with transmitting the report, one or more techniques for detecting a change to the environmental state, or a threshold associated with the one or more techniques for each respective scheme of the set of schemes.

Aspect 19: The method of any of aspects 15 through 18, further comprising: transmitting a MAC-CE that activates a subset of the set of schemes for reporting the environmental state associated with the UE.

Aspect 20: The method of any of aspects 15 through 18, further comprising: transmitting DCI that activates a scheme of the set of schemes for reporting the environmental state associated with the UE.

Aspect 21: The method of any of aspects 15 through 20, wherein receiving the report indicating the environmental state associated with the UE comprises: receiving UCI comprising the report.

Aspect 22: The method of any of aspects 15 through 21, further comprising: updating a second machine learning model based at least in part on the environmental state associated with the UE, wherein the updated second machine learning model comprises the machine learning model; and transmitting signaling indicating one or more parameters associated with the machine learning model.

Aspect 23: The method of any of aspects 15 through 22, wherein the environmental state associated with the UE is based at least in part on one or more channel characteristics, the one or more channel characteristics comprise an RSRP, an SINR, a Doppler delay, a delay spread, an angle of arrival of a received signal, an angle of departure of a transmitted signal, or any combination thereof.

Aspect 24: The method of any of aspects 15 through 23, wherein the environmental state associated with the UE is based at least in part on one or more sensor outputs, the one or more sensor outputs comprise a velocity of the UE, a location of the UE relative to the network entity, an orientation of the UE, or any combination thereof.

Aspect 25: The method of any of aspects 15 through 24, wherein the environmental state comprises conditions of radio frequency signals that surround the UE.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a network entity, comprising a processor; memory coupled with the processor; and instructions stored in the memory and executable by the processor to cause the apparatus to perform a method of any of aspects 15 through 25.

Aspect 30: An apparatus for wireless communication at a network entity, comprising at least one means for performing a method of any of aspects 15 through 25.

Aspect 31: A non-transitory computer-readable medium storing code for wireless communication at a network entity, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving control signaling indicating a set of schemes for reporting an environmental state associated with the UE;
    measuring one or more channel characteristics according to a scheme of the set of schemes; and
    transmitting a report indicating the environmental state associated with the UE based at least in part on measuring the one or more channel characteristics, wherein a machine learning model implemented by the UE, a network entity, or both is based at least in part on the indicated environmental state associated with the UE.

2. The method of claim 1, further comprising:
    transmitting signaling indicating a capability of the UE to report the environmental state associated with the UE, wherein receiving the control signaling is based at least in part on transmitting the signaling.

3. The method of claim 2, wherein transmitting the signaling indicating the capability comprises:
    transmitting radio resource control signaling indicating the capability of the UE to report the environmental state associated with the UE, the radio resource control signaling comprising an indication of the capability of the UE to measure the one or more channel characteristics, one or more second channel characteristics supported by the UE, one or more techniques for detecting a change to the one or more channel characteristics supported by the UE, a set of resources for monitoring the one or more channel characteristics supported by the UE, a periodicity associated with the set of resources supported by the UE, or any combination thereof.

4. The method of claim 1, wherein receiving the control signaling indicating the set of schemes for reporting the environmental state associated with the UE comprises:
    receiving radio resource control signaling indicating the set of schemes for reporting the environmental state associated with the UE, the radio resource control signaling comprising an indication of an identifier, a set of resources for measuring the one or more channel characteristics, a type of reference signal to be received over the set of resources, one or more second channel characteristics, a periodicity associated with the set of resources, a periodicity associated with transmitting the report, a trigger event corresponding to transmitting the report, one or more techniques for detecting a change to the environmental state, or a threshold associated with the one or more techniques for each respective scheme of the set of schemes.

5. The method of claim 1, further comprising:
    receiving a medium access control-control element that activates a subset of the set of schemes for reporting the environmental state associated with the UE, wherein measuring the one or more channel characteristics is based at least in part on receiving the medium access control-control element.

6. The method of claim 1, further comprising:
    receiving downlink control information that activates the scheme of the set of schemes for reporting the environmental state associated with the UE, wherein measuring the one or more channel characteristics is based at least in part on receiving the downlink control information.

7. The method of claim 1, wherein transmitting the report indicating the environmental state associated with the UE comprises:
    transmitting uplink control information comprising the report.

8. The method of claim 1, further comprising:
    comparing the one or more channel characteristics with one or more second channel characteristics that are stored at the UE; and
    determining that a divergence parameter between the one or more channel characteristics and the one or more second channel characteristics satisfies a threshold, wherein transmitting the report is based at least in part on the divergence parameter satisfying the threshold.

9. The method of claim 8, wherein comparing the one or more channel characteristics with the one or more second channel characteristics comprises:
    determining the divergence parameter between the one or more channel characteristics and the one or more second channel characteristics, wherein transmitting the report is based at least in part on the divergence parameter between the one or more channel characteristics and the one or more second channel characteristics exceeding the threshold.

10. The method of claim 1, further comprising:
receiving, based at least in part on transmitting the report, signaling indicating one or more parameters associated with the machine learning model.

11. The method of claim 10, further comprising:
implementing the machine learning model to perform one or more wireless procedures based at least in part on the one or more parameters associated with the machine learning model.

12. The method of claim 1, further comprising:
determining the environmental state associated with the UE based at least in part on the one or more channel characteristics, wherein the one or more channel characteristics comprise a reference signal received power, a signal-to-interference-plus-noise ratio, a Doppler delay, a delay spread, an angle of arrival of a received signal, an angle of departure of a transmitted signal, or any combination thereof.

13. The method of claim 1, further comprising:
determining the environmental state associated with the UE based at least in part on one or more sensor outputs, wherein the one or more sensor outputs comprise a velocity of the UE, a location of the UE relative to the network entity, an orientation of the UE, or any combination thereof.

14. The method of claim 1, wherein the environmental state comprises conditions of radio frequency signals that surround the UE.

15. A method for wireless communication at a network entity, comprising:
transmitting control signaling indicating a set of schemes for reporting an environmental state associated with a user equipment (UE); and
receiving a report indicating the environmental state associated with the UE based at least in part on the control signaling, wherein a machine learning model implemented by the UE, the network entity, or both is based at least in part on the indicated environmental state associated with the UE.

16. The method of claim 15, further comprising:
receiving, from the UE, signaling indicating a capability of the UE to report the environmental state associated with the UE, wherein transmitting the control signaling is based at least in part on receiving the signaling.

17. The method of claim 16, wherein receiving the signaling indicating the capability comprises:
receiving radio resource control signaling indicating the capability of the UE to report the environmental state associated with the UE, the radio resource control signaling comprising an indication of the capability of the UE to measure to one or more channel characteristics, one or more second channel characteristics supported by the UE, one or more techniques for detecting a change to the one or more channel characteristics supported by the UE, a set of resources for measuring the one or more channel characteristics supported by the UE, a periodicity associated with the set of resources supported by the UE, or any combination thereof.

18. The method of claim 15, wherein transmitting the control signaling indicating the set of schemes for reporting the environmental state associated with the UE comprises:
transmitting radio resource control signaling indicating the set of schemes for reporting the environmental state associated with the UE, the radio resource control signaling comprising an indication of an identifier, a set of resources for measuring for one or more channel characteristics, a type of reference signals to be received over the set of resources, one or more second channel characteristics, a periodicity associated with the set of resources, a periodicity associated with transmitting the report, one or more techniques for detecting a change to the environmental state, or a threshold associated with the one or more techniques for each respective scheme of the set of schemes.

19. The method of claim 15, further comprising:
transmitting a medium access control-control element that activates a subset of the set of schemes for reporting the environmental state associated with the UE.

20. The method of claim 15, further comprising:
transmitting downlink control information that activates a scheme of the set of schemes for reporting the environmental state associated with the UE.

21. The method of claim 15, wherein receiving the report indicating the environmental state associated with the UE comprises:
receiving uplink control information comprising the report.

22. The method of claim 15, further comprising:
updating a second machine learning model based at least in part on the environmental state associated with the UE, wherein the updated second machine learning model comprises the machine learning model; and
transmitting signaling indicating one or more parameters associated with the machine learning model.

23. The method of claim 15, wherein:
the environmental state associated with the UE is based at least in part on one or more channel characteristics, the one or more channel characteristics comprise a reference signal received power, a signal-to-interference-plus-noise ratio, a Doppler delay, a delay spread, an angle of arrival of a received signal, an angle of departure of a transmitted signal, or any combination thereof.

24. The method of claim 15, wherein:
the environmental state associated with the UE is based at least in part on one or more sensor outputs, the one or more sensor outputs comprise a velocity of the UE, a location of the UE relative to the network entity, an orientation of the UE, or any combination thereof.

25. The method of claim 15, wherein the environmental state comprises conditions of radio frequency signals that surround the UE.

26. An apparatus for wireless communication at a user equipment (UE), comprising:
a processor;
memory coupled with the processor; and
instructions stored in the memory and executable by the processor to cause the apparatus to:
receive control signaling indicating a set of schemes for reporting an environmental state associated with the UE;
measure one or more channel characteristics according to a scheme of the set of schemes; and
transmit a report indicating the environmental state associated with the UE based at least in part on measuring the one or more channel characteristics, wherein a machine learning model implemented by the UE, a network entity, or both is based at least in part on the indicated environmental state associated with the UE.

27. The apparatus of claim 26, wherein the instructions are further executable by the processor to cause the apparatus to:

transmit signaling indicating a capability of the UE to report the environmental state associated with the UE, wherein receiving the control signaling is based at least in part on transmitting the signaling.

28. The apparatus of claim 26, wherein the instructions are further executable by the processor to cause the apparatus to:

receive a medium access control-control element that activates a subset of the set of schemes for reporting the environmental state associated with the UE, wherein measuring the one or more channel characteristics is based at least in part on receiving the medium access control-control element.

29. An apparatus for wireless communication at a network entity, comprising:

a processor;

memory coupled with the processor; and instructions stored in the memory and executable by the processor to cause the apparatus to:

transmit control signaling indicating a set of schemes for reporting an environmental state associated with a user equipment (UE); and receive a report indicating the environmental state associated with the UE based at least in part on the control signaling, wherein a machine learning model implemented by the UE, the network entity, or both is based at least in part on the indicated environmental state associated with the UE.

30. The apparatus of claim 29, wherein the instructions are further executable by the processor to cause the apparatus to:

receive, from the UE, signaling indicating a capability of the UE to report the environmental state associated with the UE, wherein transmitting the control signaling is based at least in part on receiving the signaling.

* * * * *